United States Patent
Zheng et al.

(10) Patent No.: US 12,114,215 B2
(45) Date of Patent: Oct. 8, 2024

(54) METHOD AND SYSTEM FOR ENHANCING MEASUREMENT CAPABILITY OF A TERMINAL DEVICE

(71) Applicant: Huawei Technologies Co., Ltd., Shenzhen (CN)

(72) Inventors: Delai Zheng, Shenzhen (CN); Jianhua Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 17/632,079

(22) PCT Filed: Jul. 31, 2020

(86) PCT No.: PCT/CN2020/106379
§ 371 (c)(1),
(2) Date: Feb. 1, 2022

(87) PCT Pub. No.: WO2021/023124
PCT Pub. Date: Feb. 11, 2021

(65) Prior Publication Data
US 2022/0279402 A1     Sep. 1, 2022

(30) Foreign Application Priority Data
Aug. 2, 2019  (CN) .......................... 201910712953.3

(51) Int. Cl.
*H04W 36/00*  (2009.01)
*H04L 5/00*   (2006.01)
(Continued)

(52) U.S. Cl.
CPC ......... *H04W 36/0083* (2013.01); *H04L 5/001* (2013.01); *H04W 24/02* (2013.01); *H04W 24/10* (2013.01)

(58) Field of Classification Search
CPC ..... H04W 24/00; H04W 24/02; H04W 24/10; H04W 36/00; H04W 36/0069;
(Continued)

(56) References Cited

U.S. PATENT DOCUMENTS 9,820,091 B1 * 11/2017 Kumar et al. .......... H04W 4/02
2010/0027467 A1 * 2/2010 Wu et al. ...................... 370/328
(Continued)

FOREIGN PATENT DOCUMENTS

CN   101873646 A   10/2010
CN   102595475 A   7/2012
(Continued)

OTHER PUBLICATIONS (BR 102016012292 A2), published to Strobl et al., on Jan. 3, 2017. discloses—Mobile Terminal Devices and Radio Measurement Implementation Methods (see at least, the title) (Year: 2017).*
(Continued)

*Primary Examiner* — Meless N Zewdu
(74) *Attorney, Agent, or Firm* — Slater Matsil, LLP

(57) ABSTRACT

A terminal device reports a measurement capability to a network side, and the network side determines, based on the capability of the terminal device and a trigger condition, whether a measurement gap needs to be allocated to the terminal device, where the measurement gap is used by the terminal device to measure an inter-frequency or inter-RAT cell. When the network side allocates the measurement gap to the terminal device, and when the terminal device determines that an objective of not allocating a gap can be achieved by de-configuring a secondary cell or reducing a data receiving rule of a currently camped-on cell. When an inter-frequency or inter-RAT cell is measured by de-config-
(Continued)

uring the secondary cell or reducing the data receiving rule of the currently camped-on cell, a cell measurement task can be completed.

19 Claims, 12 Drawing Sheets

(51) Int. Cl.
*H04W 24/02* (2009.01)
*H04W 24/10* (2009.01)

(58) Field of Classification Search
CPC ......... H04W 36/0058; H04W 36/0072; H04W 36/0094; H04W 36/0088; H04W 36/0066; H04W 36/0085; H04W 64/00; H04W 72/542; H04W 72/543; H04W 76/00; H04W 76/10; H04W 88/00; H04W 88/005; H04W 88/02; H04W 88/08; H04W 88/18; H04W 8/02; H04W 8/00; H04W 8/08; H04W 8/26; H04W 36/0083; H04W 8/24; H04W 36/00692; H04W 88/06; H04W 36/0061; H04W 36/0064; H04W 92/02; H04B 7/08; H04B 7/0811; H04B 10/079; H04L 5/001
See application file for complete search history.

(56) References Cited

U.S. PATENT DOCUMENTS

| | | | |
|---|---|---|---|
| 2010/0316034 A1* | 12/2010 | Burbidge et al. | 370/338 |
| 2010/0317374 A1* | 12/2010 | Burbidge et al. | 455/436 |
| 2011/0151876 A1* | 6/2011 | Ishii et al. | 455/437 |
| 2011/0206011 A1* | 8/2011 | Ishida et al. | 370/331 |
| 2012/0094608 A1* | 4/2012 | Shi et al. | 455/67.11 |
| 2012/0113866 A1 | 5/2012 | Tenny et al. | |
| 2013/0308481 A1* | 11/2013 | Kazmi et al. | H04W 24/02 |
| 2014/0200016 A1* | 7/2014 | Siomina et al. | H04W 28/20 |
| 2014/0341192 A1* | 11/2014 | Venkob et al. | H04W 72/0446 |
| 2015/0172974 A1* | 6/2015 | Liu et al. | H04W 36/0083 |
| 2015/0312717 A1* | 10/2015 | Shih et al. | H04W 4/025 |
| 2017/0064578 A1* | 3/2017 | Takahashi et al. | H04W 24/10 |
| 2018/0176710 A1* | 6/2018 | Jang et al. | H04W 4/005 |
| 2018/0324807 A1 | 11/2018 | Liu et al. | |
| 2019/0069205 A1* | 2/2019 | Lee et al. | H04W 36/00835 |
| 2019/0222478 A1 | 7/2019 | Yi et al. | |
| 2019/0327655 A1* | 10/2019 | Lee et al. | H04W 36/08 |
| 2019/0363846 A1* | 11/2019 | Lei et al. | H04L 5/0014 |
| 2020/0008116 A1* | 1/2020 | Zhang et al. | H04W 36/00835 |
| 2020/0374723 A1* | 11/2020 | Zheng | H04W 24/08 |

FOREIGN PATENT DOCUMENTS

| | | | | |
|---|---|---|---|---|
| CN | 103270787 A | 8/2013 | | |
| CN | 105323851 A | 2/2016 | | |
| CN | 106256142 A | 12/2016 | | |
| CN | 106304128 A | 1/2017 | | |
| CN | 106535215 A | 3/2017 | | |
| CN | 108282799 A | 7/2018 | | |
| CN | 109803304 A | 5/2019 | | |
| EP | 2570130 A1 * | 3/2013 | | A61K 31/424 |
| GB | 2570130 A * | 7/2019 | | H04B 7/0617 |
| WO | WO 2012112103 A1 * | 8/2012 | | H04W 36/00 |
| WO | WO 2013025160 A1 * | 2/2013 | | H04W 24/10 |
| WO | 2015016177 A1 | 2/2015 | | |

OTHER PUBLICATIONS (WO 2019100396 A1) >>> Inter-Frequency Cell Measurement Method, Device, Chip and Storage Medium ( see title) (Year: 2019).*
(WO 2019191992 A1) >>> Method for Cell Measurement, Terminal Device, and Network Device (see title) (Year: 2019).*
Huawei., "Generalization of A1 and A2 in CA", 3GPP TSG-RAN WG2 meeting #69, R2-101020, Feb. 22-26, 2010, 4 Pages, San Francisco, US.
Ericsson, "Summary of Email Discussion [69#34] LTE: CA Measurements", 3GPP TSG-RAN WG2 #69, R2-102038, Apr. 12-16, 2010, 17 Pages, Beijing, China.
Nokia Siemens Networks et al., "Mobility Statistics for Macro and Small Cell Dual-Connectivity Cases", 3GPP TSG-RAN WG2 Meeting #81, R2-131056, Apr. 15-19, 2013, 7 Pages, Chicago, USA.
Nokia et al., "Initial simulations for mobility in carrier aggregation", 3GPP TSG-RAN WG4 #55, R4-102041, May 10-14, 2010, 9 Pages, Montreal, Canada.
Ericsson, "On UE capability for s-Measure per reporting configuration", 3GPP TSG-RAN2 Meeting #104, R2-1817647, Spokane, WA, US, Nov. 12-16, 2018, 5 pages.
Qualcomm Inc., "Update of NR RRC TC—Measurement configuration control and reporting / Inter-RAT measurements / Periodic reporting / Measurement of NR cells", 3GPP TSG-RAN WG5#79, R5-183133, Busan, South Korea, May 21-25, 2018, 12 pages.

* cited by examiner

METHOD AND SYSTEM FOR ENHANCING MEASUREMENT CAPABILITY OF A TERMINAL DEVICE

CROSS-REFERENCE TO RELATED APPLICATIONS

This application is a national stage of International Application No. PCT/CN2020/106379, filed on Jul. 31, 2020, which is hereby incorporated by reference in its entirety, which claims priority to Chinese Patent Application No. 201910712953.3, filed on Aug. 2, 2019. Both of the aforementioned applications are hereby incorporated by reference in their entireties.

TECHNICAL FIELD

This application relates to a method for enhancing a measurement capability of a terminal device, a chip, and the terminal device, and in particular, for a measurement capability of a terminal device for inter-frequency or inter-RAT measurement.

BACKGROUND

The 3rd generation partnership project (3rd Generation Partnership Project, 3GPP) proposes: If a terminal device needs to perform inter-frequency or inter-RAT measurement, a simple manner is to install two radio frequency receivers in the terminal device to separately measure a frequency channel number of a current cell and a frequency channel number of a target cell. However, this causes problems that costs are increased and different frequency channel numbers interfere with each other. Therefore, a manner of a measurement gap (measurement gap, Gap) is proposed in the 3GPP. To be specific, a time period (namely, duration of the measurement gap) is reserved. In this time period, the terminal device does not send or receive any data, but tunes the receiver to the frequency channel number of the target cell, performs inter-frequency measurement, and then is handed over to the current cell after the duration of the measurement gap ends.

Within the duration of the measurement gap, the terminal device does not send or receive any data, and consequently, a data service of a user is interrupted, suspended, or the like, and user experience is poor.

SUMMARY

Based on this, the present invention provides a terminal device and a method, to enhance a measurement capability of the terminal device, avoid, as much as possible, using a measurement gap allocated by a network, and reduce an opportunity of interruption, suspension, and the like of a data service of a user.

According to one aspect, an embodiment of this application provides a method for enhancing a measurement capability of a terminal device, including: The terminal device sends first information to a network device, where the first information is used to indicate whether a measurement gap is required when the terminal device performs inter-frequency or inter-RAT measurement, and the first information is further used to indicate a multiple-input multiple-output capability of the terminal device; the terminal device camps on a first cell and a second cell by using a carrier aggregation CA technology, where the first cell and the second cell are LTE cells, and the first cell is a primary cell; when the terminal device meets a preset first condition or a network side meets a preset second condition, the network side allocates measurement gap information to the terminal device based on the first information, where the first information is further used to indicate the multiple-input multiple-output capability of the terminal device; the terminal device reports assistance information, where the assistance information is used to indicate to change the multiple-input multiple-output capability of the terminal device; and the network device does not allocate the measurement gap information to the terminal device based on the assistance information and the first information. In this way, the terminal device measures a neighboring cell without using a measurement gap allocated by the network side, so that a measurement capability of the terminal device is enhanced.

In a possible design, the network device sends measurement control information to the terminal device based on the assistance information and the first information, where the measurement control information is used to measure a network parameter of a third cell; the terminal device measures the network parameter of the third cell based on the measurement control information; and the terminal device sends a measurement report about the third cell to the network device.

In a possible design, the assistance information is AssistanceInformation, and the first information includes at least either of InterFreqNeedForGaps and interRAT-NeedForGaps. The measurement capability of the terminal device is enhanced by using a command in an existing protocol.

In another possible design, the preset first condition is that a network parameter of the first cell is less than a preset value, and the preset second condition is that the network device needs to measure a network parameter of a neighboring cell.

According to a second aspect, an embodiment of this application provides a method for enhancing a measurement capability of a terminal device, including: The terminal device sends first information to a network device, where the first information is used to indicate whether a measurement gap is required when the terminal device performs inter-frequency measurement; the terminal device camps on a first cell and a second cell by using a carrier aggregation CA technology, where the first cell and the second cell are LTE cells, and the first cell is a primary cell; when the terminal device meets a preset first condition or the network device meets a preset second condition, the network device sends a second message to the terminal device based on the first information, where the second message is used to measure a network parameter of a third cell, and the second message includes measurement gap information; the terminal device reports an event A2 of the second cell, where the event A2 is used to enable the network device to de-configure the second cell; and the network device sends a third message to the terminal device, where the third message is used to measure the network parameter of the third cell, and the third message includes no-gap information. In this way, the terminal device measures a network parameter of a neighboring cell without using the measurement gap.

In a possible design, the method further includes: The terminal device measures the network parameter of the third cell based on the third message; and the terminal device sends a measurement report about the third cell to the network device. In this way, the terminal device measures a network parameter of a neighboring cell without using measurement detection.

In another possible design, the preset first condition is that a network parameter of the first cell is less than a preset value, and the preset second condition is that the network device needs to measure a network parameter of a neighboring cell.

In another possible design, after the terminal device reports the event A2 of the second cell, the method further includes: The network device sends a fourth message to the terminal device, where the fourth message is used to de-configure the second cell; the terminal de-configures the second cell based on the fourth message; and the terminal device sends a fifth message to the network device, where the fifth message is used to indicate that the terminal device has de-configured the second cell. In this way, the terminal device measures a network parameter of a neighboring cell without using measurement detection. In this way, the neighboring cell is measured by using a channel of a secondary cell, so that an opportunity of interruption, suspension, and the like of a data service of a user is reduced.

In another possible design, the first information includes at least either of InterFreqNeedForGaps and interRAT-NeedForGaps. The measurement capability of the terminal device is enhanced by using a command in an existing protocol.

According to a third aspect, an embodiment of this application further provides a communication system. A terminal device camps on a first cell and a second cell by using a carrier aggregation CA technology, where the first cell and the second cell are LTE cells, and the first cell is a primary cell. The terminal device is configured to: send first information to a network device, where the first information is used to indicate whether a measurement gap is required when the terminal device performs inter-frequency measurement; and report an event A2 of the second cell when the terminal device meets a preset first condition or the network device meets a preset second condition, where the event A2 is used to enable the network device to de-configure the second cell. The network device is configured to: send a second message to the terminal device based on the first information, where the second message is used to measure a network parameter of a third cell, and the second message includes measurement gap information; and send a third message to the terminal device, where the third message is used to measure the network parameter of the third cell, and the third message includes no-gap information. In this way, an opportunity of interruption, suspension, and the like of a data service of a user is reduced.

In a possible design, the terminal device is further configured to: measure the network parameter of the third cell based on the third message; and send a measurement report about the third cell to the network device.

In another possible design, the preset first condition is that a network parameter of the first cell is less than a preset value, and the preset second condition is that the network device needs to measure a network parameter of a neighboring cell.

In another possible design, the network device is further configured to: send a fourth message to the terminal device, where the fourth message is used to de-configure the second cell; and the terminal device is further configured to: de-configure the second cell based on the fourth message; and send a fifth message to the network device, where the fifth message is used to indicate that the terminal device has de-configured the second cell.

In another possible design, the first information includes at least either of InterFreqNeedForGaps and interRAT-NeedForGaps. A measurement capability of the terminal device is enhanced by using a command in an existing protocol.

According to a fourth aspect, an embodiment of this application provides a chip system, including: a memory, where the memory stores instructions; a processor; and an interface, configured to receive code instructions and transmit the code instructions to the processor, where the processor is configured to run the code instructions to perform the following method: A terminal device sends first information to a network device, where the first information is used to indicate whether a measurement gap is required when the terminal device performs inter-frequency measurement; the terminal device camps on a first cell and a second cell by using a carrier aggregation CA technology, where the first cell and the second cell are LTE cells, and the first cell is a primary cell; the network device sends second information to the terminal device, where the second information is used to measure a network parameter of a third cell, the third cell is an NR cell, and the second information includes a measurement gap; the terminal device suspends data receiving/sending in the second cell when the terminal device finds no third cell during the measurement gap; and the terminal device measures the network parameter of the third cell. In this way, an opportunity of interruption, suspension, and the like of a data service of a user is reduced.

In a possible design, the code further includes: sending a measurement report to the network device based on the network parameter of the third cell.

In a possible design, that the terminal device suspends data receiving/sending in the second cell when the terminal device finds no third cell during the measurement gap includes: The terminal device reduces a multiple-input multiple-output capability.

According to a fifth aspect, an embodiment of this application further provides a method and a device for reporting a measurement capability of a terminal device with a loss. The method includes: When the terminal device has a first measurement capability, where the first capability is used to indicate whether a measurement gap is required when the terminal device performs inter-frequency measurement, the terminal device determines a second measurement capability, where the second capability is used to indicate whether a measurement gap is required when the terminal device performs inter-frequency measurement, and the second measurement capability is obtained based on the first measurement capability in at least one of the following manners: reducing a quantity of receive channels of the terminal device, de-activating a secondary cell, and changing a receive antenna; and the terminal device reports the second measurement capability to a network device.

In a possible design, the network device sends a first message to the terminal device based on the second measurement capability when a trigger condition is met, where the first message does not include measurement detection, and the first message is used to measure a network parameter of a neighboring cell. In this way, an opportunity of interruption, suspension, and the like of a data service of a user is reduced.

In a possible design, the terminal device reports the first measurement capability to the network device, and the network device sends a second message to the terminal device based on the first measurement capability when a trigger condition is met, where the first message includes measurement detection, and the first message is used to measure a network parameter of a neighboring cell.

According to a sixth aspect, an embodiment of the present invention provides a storage medium, configured to store computer software instructions for implementing the foregoing implementations.

According to a seventh aspect, an embodiment of the present invention provides a device, and the device can enhance a measurement capability of the foregoing terminal device. The function may be implemented by using hardware, or may be implemented by executing corresponding software by using hardware. The hardware or the software includes one or more modules corresponding to the foregoing function. The module may be hardware and/or software.

DETAILED DESCRIPTION OF ILLUSTRATIVE EMBODIMENTS

Generally, according to definitions in a 3GPP protocol (for example, 3GPP TS36.214), when a terminal device is in a connected state (connection), the terminal device reports measurement reports about a measured serving cell and a measured neighboring cell to a network side periodically or upon triggering by an event, and may perform actions such as cell selection, reselection, and handover based on the measurement reports; and when the terminal device is in an idle state (idle), the terminal device camps on a cell with a highest priority. In some possible embodiments, a priority for camping on a cell may be set based on parameters such as signal quality, a delay, a packet loss rate, reference signal received power (Reference Signal Receiving Power, PSRP), a received signal strength indicator (Received Signal Strength Indicator, RSSI), and reference signal received quality (Reference Signal Received Quality, RSRQ) of the cell.

Figure 1:
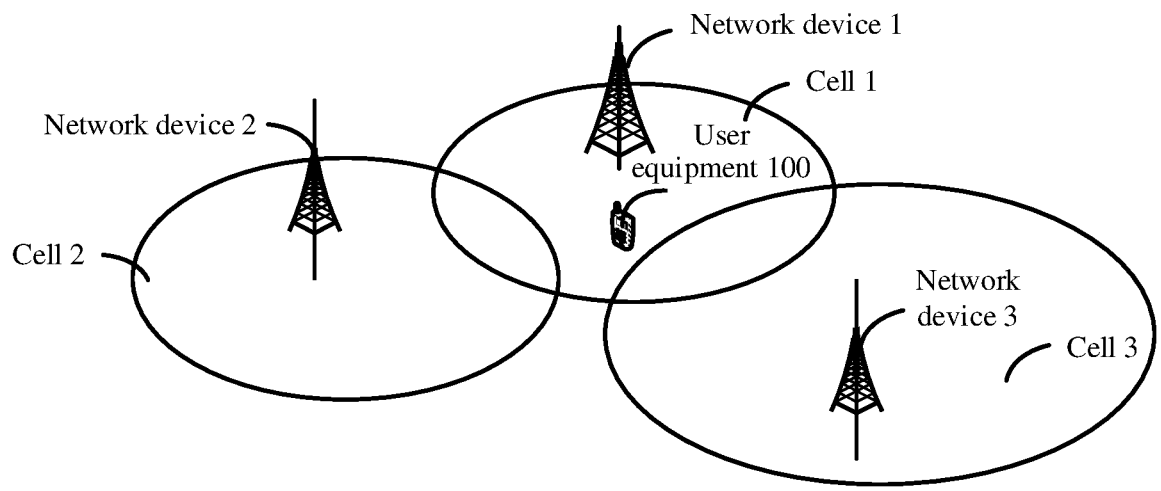
FIG. 1 is a schematic diagram of a network system according to an embodiment of this application.

As shown in FIG. 1, a network system is provided, and includes at least one terminal device 100 and at least one network device 1. In some embodiments, the terminal device 100 may be a device such as a mobile phone, a tablet computer, a handheld computer, a notebook computer, an ultra-mobile personal computer (Ultra-mobile Personal Computer, UMPC), a netbook, a cellular phone, a personal digital assistant (Personal Digital Assistant, PDA), a wearable device (such as a smart watch), or an augmented reality (augmented reality, AR)/virtual reality (virtual reality, VR) device. A specific form of the device is not specially limited in embodiments. The network device may be a base station (for example, a GSM base station, an NB base station, an eNB base station, or an NR base station), a server, a network element, or the like. In embodiments, an LTE (Long Term Evolution Advanced, "LTE") network system is used as an example. In other words, the network device and user equipment are devices that support an LTE function. The embodiments may be extended to another network system.

The network device 1 is a 4G base station that supports the LTE function, namely, an eNB. Based on a radio coverage area of the eNB, the eNB may generally have at least one serving cell (cell), namely, a serving cell 1. The cell is an area that provides a wireless communication service for a user, and is a basic component unit in a wireless network. The eNB may alternatively have a plurality of cells. Each cell may use a different radio carrier, and each radio carrier uses a frequency channel number of a specific carrier. For ease of description in this application, each cell corresponds to one network device, but this is not limited. One network device may alternatively correspond to a plurality of different cells, including one primary cell and a plurality of secondary cells.

In a wireless technology, a concept of CA (Carrier Aggregation, carrier aggregation) is introduced. In brief, a plurality of carriers may be aggregated to obtain a wider spectrum, and some discontinuous spectrum fragments may be aggregated. It may be understood that in carrier aggregation (Carrier Aggregation, CA), two or more component carriers (Component Carrier, CC) are aggregated to support higher transmission bandwidth. To efficiently use fragmentary spectra, there are a plurality of CA manners: CCs with same bandwidth or different bandwidth are aggregated; adjacent or non-adjacent CCs on a same frequency band are aggregated; and CCs on different frequency bands are aggregated.

Each component carrier CC corresponds to one independent cell (cell). In a CA scenario, there are the following several types of cells:

Primary cell (Primary Cell, Pcell): A primary cell is a cell that operates on a primary frequency band. A terminal device performs an initial connection establishment procedure or initiates a connection re-establishment procedure in the cell. In a handover procedure, the cell is indicated as the primary cell.

Secondary cell (Secondary Cell, Scell): A secondary cell is a cell that operates on a secondary frequency band. The secondary cell may be configured once an RRC connection is established and used to provide additional radio resources.

Serving cell: For a terminal device in an RRC_CONNECTED state, if CA is not configured, there is only one serving cell, namely, a Pcell; if CA is configured, a serving cell set includes a Pcell and a Scell.

The Pcell and the secondary cell Scell are user-level concepts for a CA user. A carrier initially accessed by a user is a Pcell for the CA user. The primary cell is a cell that operates on the primary frequency band. The terminal device performs an initial connection establishment procedure or initiates a connection re-establishment procedure in the cell. In a handover procedure, the cell is indicated as the primary cell. The secondary cell is a cell that operates on a secondary frequency band. The secondary cell may be configured once an RRC (Radio Resource Control, RRC) connection is established and used to provide additional radio resources (refer to Chapter 3.1 in 36.331).

Figure 2:
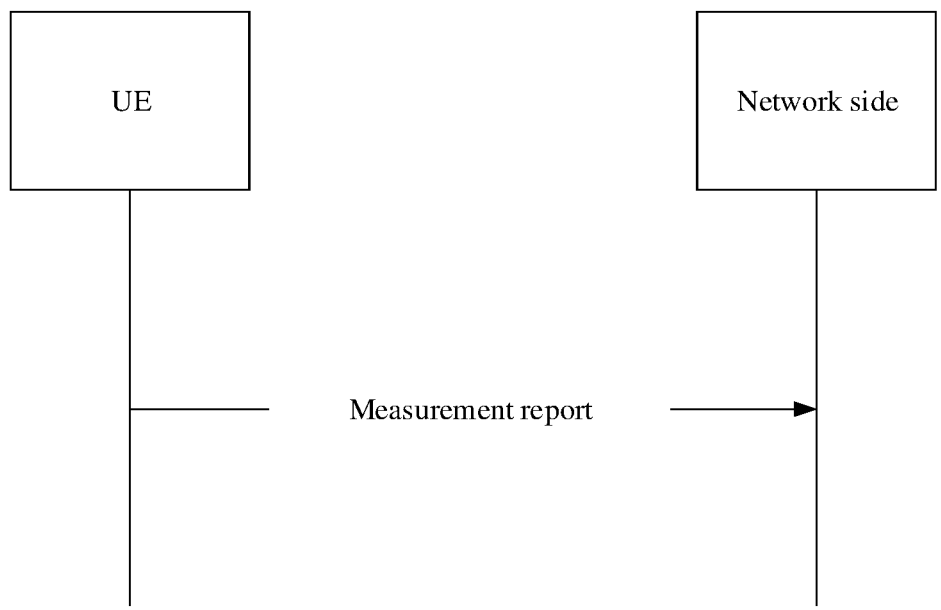
FIG. 2 is a schematic diagram of reporting a measurement capability by a terminal device according to an embodiment of this application.

FIG. 2 is a schematic diagram of reporting measured network quality by a terminal device. Measurement reporting (MR, Measurement Report) is an important function of an LTE system. A measurement result reported by a physical layer may be used by a radio resource control sublayer in the system to trigger events such as cell selection/reselection and handover, and may be further used for functions such as network neighboring cell maintenance and SCG addition. An LTE MR report may further include reference signal received power, reference signal received quality, eNB received interference power, an angle of arrival of an eNB antenna, a transmit power headroom of the terminal device, an uplink packet loss rate, a downlink packet loss rate, an uplink signal to noise ratio, a PRB granularity, and eNB received interference power. A network-wide coverage situation, a network-wide interference situation, uplink high transmit power, and a location of the terminal device may be analyzed based on the MR. For example, the eNB received interference power RIP in the MR may be used to statistically analyze the network-wide interference situation, to locate a high-interference cell. In a connected state, network measurement usually has the following objectives:

1. Handover of a Pcell: When network quality of the Pcell on which the terminal device camps meets a preset condition, for example, signal quality of the current cell is less than a threshold, an event A2 (Event A2) is triggered, and a network allocates an inter-frequency channel number to measure network quality of a neighboring cell. Measurement of an intra-frequency neighboring cell does not need to be indicated by the network, and the terminal device may perform measurement at any time in the connected state.
2. Addition of a Scell: If a measured cell meets an event A4, that is, EventA4, and a trigger condition of the event A4 may be that the measured cell is greater than a threshold configured by the network, the network may configure the Scell for a user, and the user may exchange data with a core network by using the Pcell and the Scell. For example, as shown in FIG. 1, when the terminal device camps on the serving cell 1, the serving cell 1 is a Pcell. After a CA technology is used, the terminal device further needs to measure a network parameter of a neighboring cell (for example, a serving cell 2 or a serving cell 3). When the measured network parameter of the neighboring cell meets a threshold configured by the network side, in other words, when the trigger condition of the event A4 is met, the network side may configure a Scell for the terminal device, so that high-bandwidth data transmission is implemented.
3. Operations such as network system operation maintenance and automatic inter-frequency neighboring cell configuration are performed based on a measurement report.
4. In some special scenarios, for example, in LTE dual-connectivity (Eutran-dual connection, EE-DC) and EN-DC dual-connectivity, the terminal device also needs to measure a target cell in dual-connectivity, for example, measure an NR 5G cell or an LTE cell.

If the terminal device does not have a no-gap measurement capability for a related frequency channel number (it can be understood that the network needs to allocate a gap to enable the terminal device to perform measurement), the network allocates gaps of the following two types for measurement (before 3GPP release 14). Table 1 shows two different types of gaps specified in the protocol, as shown in the following table.

| Gap index | Gap length (ms) | Gap period (ms) | Measurement objective |
| --- | --- | --- | --- |
| 0 | 6 | 40 | Inter-frequency eUTRAN FDD/TDD, UTRAN FDD, GERAN, CDMA2000 1x, and the like |
| 1 | 6 | 80 | Inter-frequency eUTRAN FDD/TDD, UTRAN FDD, GERAN, CDMA2000 1x, and the like |

It can be learned that the gap length is 6 ms, and the gap period is 40 ms or 80 ms, which are used to measure a network parameter of an inter-frequency or inter-RAT cell. Generally, the terminal device cannot receive/send data due to existence of the gap. To be specific, when the terminal device measures network quality of a neighboring cell based on the gap allocated by the network side, the terminal device usually cannot receive/send data. The system shown in FIG. 1 is used as an example. When the network side currently allocates the gap to measure the neighboring cell (the serving cell 2 or the serving cell 3), the terminal device cannot receive/send data by using the serving cell 1. Alternatively, the system shown in FIG. 1 is used as an example. The current terminal device supports a CA capability. For example, the serving cell 1 is a Pcell whose frequency band is A1, and the serving cell 2 is a secondary cell whose frequency band is A3. In this case, the terminal device may have a capability of obtaining frequency bands A1+A3 through CA; and if the gap is used to measure the neighboring cell (for example, the serving cell 3), the terminal device cannot receive/send data by using the serving cell 1 or the serving cell 2.

Figure 3:
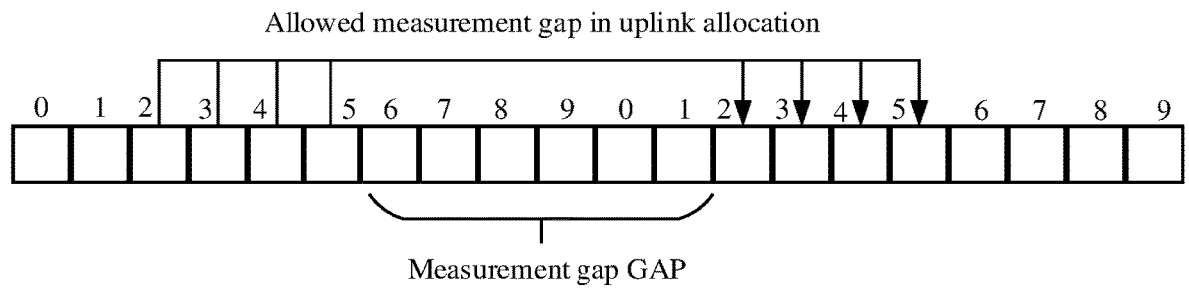
FIG. 3 is a first schematic diagram of a measurement gap according to an embodiment of this application.

FIG. 3 is a schematic diagram of a typical gap. For example, the gap needs to be allocated because LTE scheduling/feedback duration is at least 4 ms, and data cannot be received/sent in at least 4 ms before and after measurement duration of the gap. In other words, for uplink data or downlink data, there are 10 ms in which data cannot be transmitted. If a measurement period is 40 ms, at least $10/40=25\%$ of scheduling opportunities are lost. In other words, 25% of performance is lost.

Figure 4:
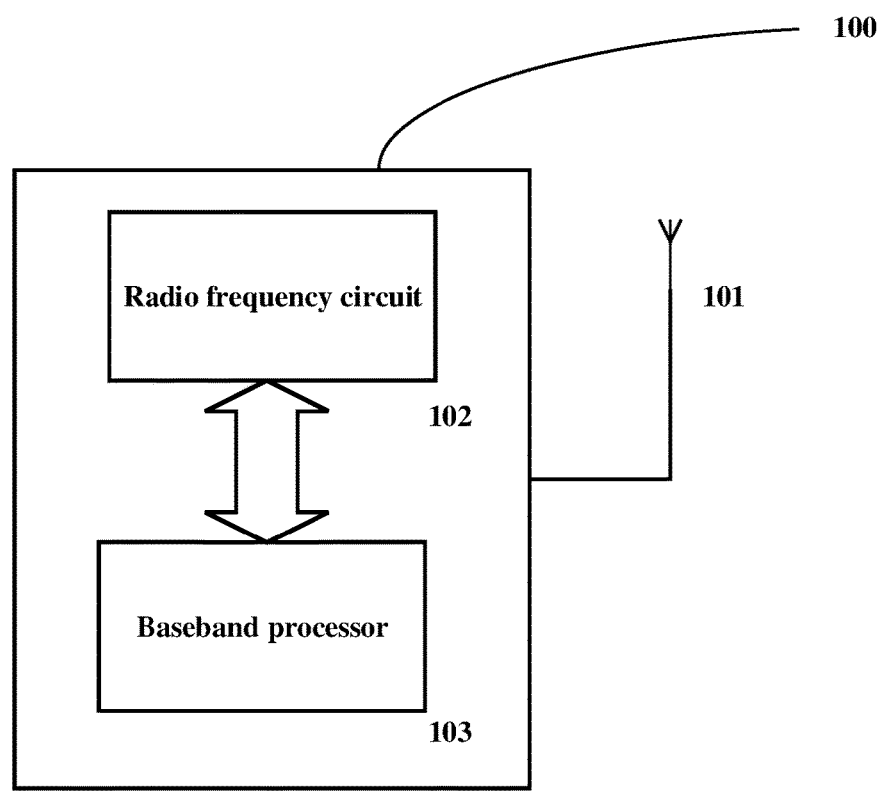
FIG. 4 is a first schematic diagram of a terminal device according to an embodiment of this application.

The terminal device usually includes an antenna, a radio frequency front-end (Front End Module, FEM), a radio frequency integrated circuit (Radio-Frequency Integrated Circuit, RFIC), a baseband (Baseband Integrated Circuit, BBIC), and the like. The RFIC represents a radio frequency channel capability of the terminal device, for example, Rx 1, Rx 2, . . . , and Rx N represent receive channels on a specific frequency band (for example, a main receive channel or a diversity receive channel). As shown in FIG. 4, a typical terminal device boo is provided, including a baseband processor 103, a radio frequency circuit 102, and an antenna 101.

Figure 5:
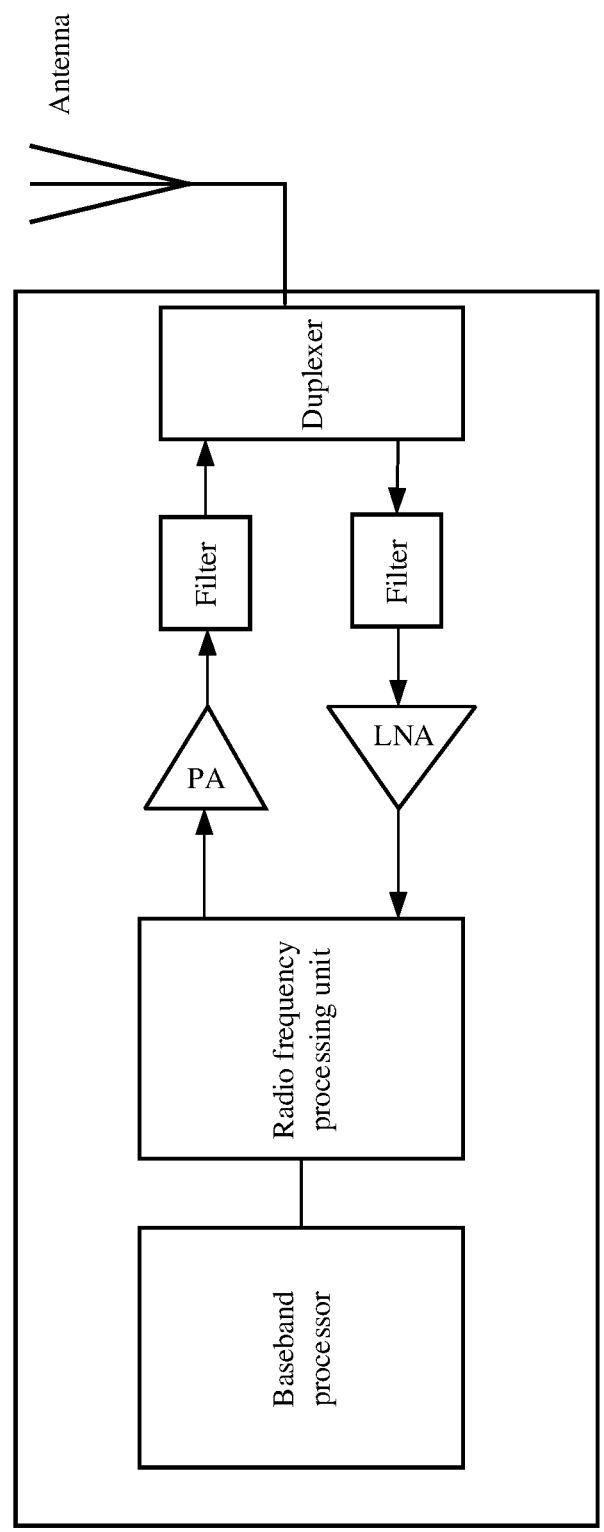
FIG. 5 is a second schematic diagram of a terminal device according to an embodiment of this application.

FIG. 5 is a schematic diagram of a typical terminal device. A terminal device 100 includes a baseband processor, a radio frequency processing unit (RFIC), a power amplifier (PA), a filter, a duplexer, an antenna, and the like. A chip platform, a radio frequency front-end, and the antenna form a wireless communication module of the terminal. The chip platform includes a baseband chip, a radio frequency chip, a power management chip, and the like. The baseband chip is responsible for a physical layer algorithm, processing of a higher layer protocol, and implementation of multi-mode inter-working. The radio frequency chip is responsible for mutual conversion between a radio frequency signal and a baseband signal. The radio frequency front end module is a necessary connection for connecting the radio frequency processing unit and the antenna, as shown in FIG. 1. The radio frequency front end module mainly includes a power amplifier (PA), a filter (Filter), a duplexer or multiplexer (Duplexer or Multiplexer), a low noise amplifier (LNA), a switch (Switch) or an antenna switch module (ASM), and the like. In architectures of radio frequency front-ends of some terminals, components such as a diplexer (Diplexer) and a coupler (Coupler) are added after an antenna switch.

However, a measurement capability of performing inter-frequency or inter-RAT measurement with or without allocation of a gap is usually determined based on a quantity of receive channels corresponding to the radio frequency processing unit RFIC. In this embodiment, it is assumed that the radio frequency front-end FEM (including the power amplifier, the filter, the duplexer, and the like) of the terminal device supports three frequency bands (B1, B3, and B7), the RFIC represents four receive channels (Rx 1, Rx 2, Rx 3, and Rx 4). In this case, a BBIC may support both data receiving/sending in a serving cell and inter-frequency measurement. It is assumed that an inter-RAT frequency channel number and a frequency channel number of the serving cell support a CA combination. In this case, the BBIC also supports both data receiving/sending in the serving cell and inter-RAT measurement. Table 2 shows an inter-frequency measurement capability (for example, by using a command InterFreqNeedforGaps) of the terminal device, and the inter-frequency measurement capability is referred to as a "measurement capability", a "capability of requiring allocation of a gap or not", a "gap capability", or a "gap measurement capability".

occupied, data receiving/sending between the terminal device and the serving cell needs to be suspended, and any two channels (for example, Rx 1 and Rx 2) are allocated to the terminal device to measure the neighboring cell. Similarly, when the terminal device performs data receiving/sending by using a CA capability, for example, in a 1A+3A scenario, a total of four channels are occupied to measure the neighboring cell. Because all channel resources of the current terminal device are occupied, the network needs to allocate a gap for measurement of a network instruction of the neighboring cell. Consequently, a current service is interrupted.

In the foregoing embodiment, when the network allocates the gap to the terminal device to perform inter-frequency or inter-RAT measurement, the terminal device cannot send or receive data when the terminal device measures the neighboring cell. Consequently, problems such as suspension of and a delay in data receiving/sending for a user are caused, and user experience is poor. It should be noted that in this application, the inter-frequency may indicate frequency bands with different center frequency channel numbers, and may be understood as an inter-frequency channel number; and the inter-RAT indicates systems in different network standards, and may be understood as different systems, for example, 3G and 4G systems.

Based on this, this application further provides another embodiment. If a terminal device has a capability of performing simultaneous receiving based on both an inter-frequency or inter-RAT frequency channel number and a frequency channel number of a serving cell, a network does not need to allocate a gap. In this case, the terminal device may perform inter-frequency or inter-RAT measurement without interrupting communication with the serving cell.

Figure 6:
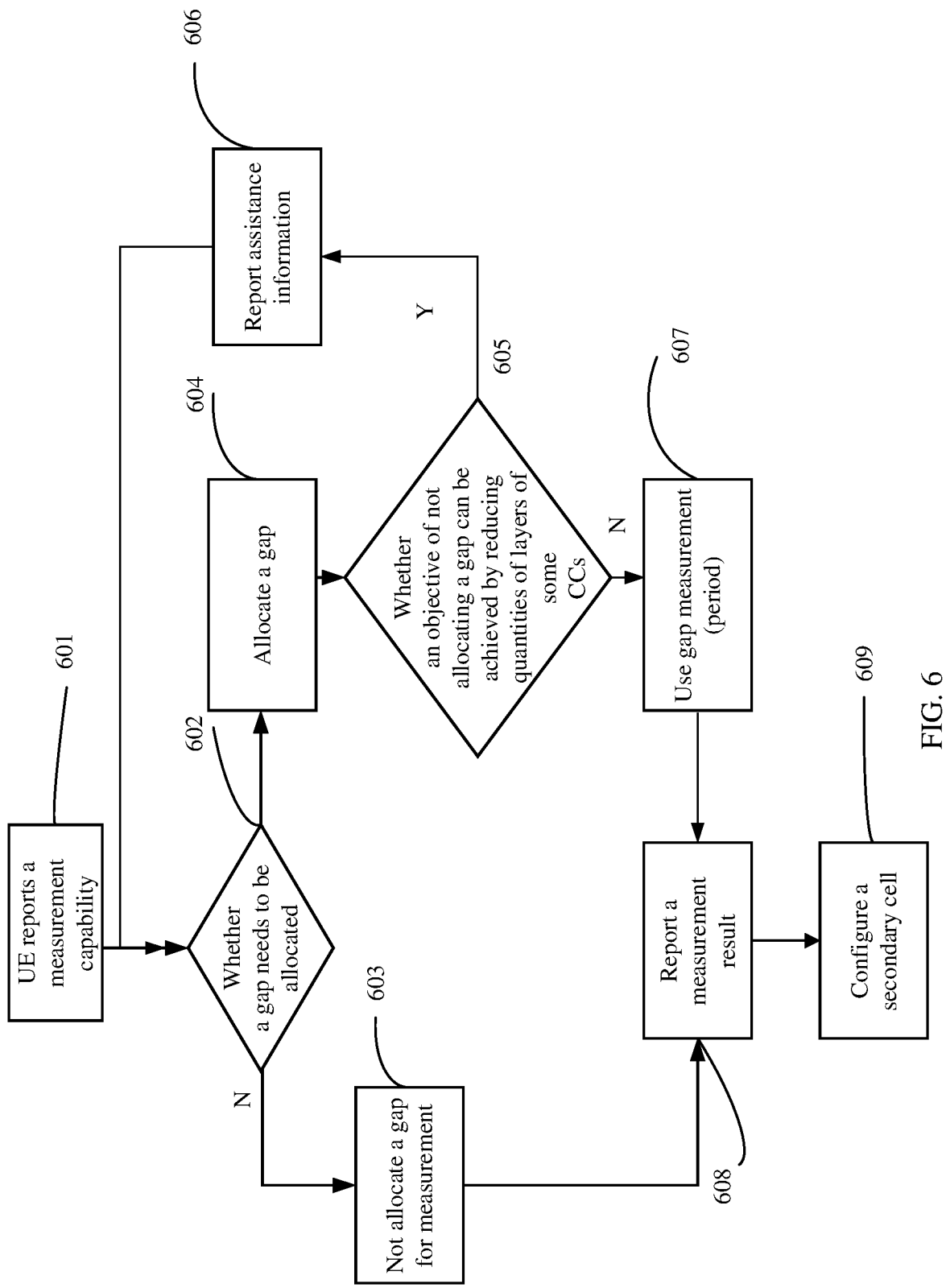
FIG. 6 is a first schematic diagram of enhancing a gap measurement capability of a terminal device according to an embodiment of this application.

As shown in FIG. 6, a method for allocating a gap based on a measurement capability of a terminal device is provided. In this embodiment, when a network allocates a gap for inter-frequency measurement, the network determines,

| InterFreqNeedforGaps | 1A | 3A | [1A]<br>4Rx | 7A | 1A + 3A | 1A + 7A | 1A + 1A | 3A + 1A | 3A + 3A | 3A + 7A | 7A + 3A |
| --- | --- | --- | --- | --- | --- | --- | --- | --- | --- | --- | --- |
| Band 1 | F | F | T | T | T | T | T | T | T | T | T |
| Band 3 | F | F | T | F | T | T | T | T | T | T | T |
| Band 7 | F | F | T | T | T | T | T | T | T | T | T |

As shown in Table 2, 1A, 3A, and 7A identify component carriers on different frequency bands (the frequency bands are a band 1, a band 2, and a band 3). Each frequency band occupies two receive channels of the terminal device, where [1A] indicates that four receive channels are occupied, and T indicates that a gap needs to be allocated. It can be learned that when the terminal device supports a CA combination or 4Rx, the network needs to allocate a gap for inter-frequency measurement. Specific descriptions are as follows: The current terminal device receives/sends data on the frequency band 1A (for example, the terminal device camps on a first cell), where the frequency band 1A occupies two receive channels (for example, Rx 1 and Rx 2). In this case, the network allocates a gap for measurement, and a neighboring cell needs to be measured by using only channels Rx 3 and Rx 4, and the network side does not need to allocate a gap. However, when the terminal device operates on the frequency band [1A], that is, four channels Rx 1, Rx 2, Rx 3, and Rx 4 are occupied, the network side needs to allocate a gap for measurement of network quality of the neighboring cell. When all four channels of the terminal device are based on the measurement capability of the terminal device, whether a gap needs to be allocated, to resolve a problem of how to measure a neighboring cell without allocation of a gap when the terminal device is in a connected state and receive channels of the terminal device are limited.

Step 601: The terminal device registers with a first cell and reports a gap measurement capability.

Generally, to obtain a service, the terminal device needs to register with a network. This registration procedure is referred to as Attach (an LTE system is used as an example). In the Attach procedure, the terminal device may report the measurement capability of the terminal device. According to definitions in a protocol, for example, parameters that identify the measurement capability of the current terminal device may be interFreqNeedForGaps and interRAT-NeedForGaps, and descriptions in the protocol are respectively "Indicates need for measurement gaps when operating on the E-UTRA band given by the entry in bandListEUTRA or on the E-UTRA band combination given by the entry in bandCombinationListEUTRA and measuring on the E-UTRA band given by the entry in interFreqBandList." and "Indicates need for DL measurement gaps when operating on the E-UTRA band given by the entry in bandListEUTRA or on the E-UTRA band combination given by the entry in bandCombinationListEUTRA and measuring on the inter-RAT band given by the entry in the interRAT-BandList".

For ease of description, Table 2 may be understood as showing the measurement capability of the current terminal device. It should be noted that Table 2 merely shows a representation form of the measurement capability of the terminal device. As shown in Table 2, content reported by the terminal device includes but is not limited to a CA capability of the terminal device. For example, the terminal device supports the following CA combinations: CA_1A-3A, CA_1A-7A, CA_1A-1A, CA_3A-1A, CA_3A-3A, CA_3A-7A, and CA_7A-3A. In some possible designs, the terminal device may further support a CA combination of a plurality of frequency bands such as CA_1A-3A-5A. The capability reported by the terminal device to a network side further includes a capability of requiring allocation of a gap or not for all CA combinations or all frequency bands supported by the terminal device. Specifically, Inter-FreqNeedForGaps is used to indicate whether a gap is required for inter-frequency measurement when a CA combination or a serving cell corresponds to a single band, and interRAT-NeedForGaps is used to indicate whether a gap is required for inter-RAT measurement when a CA or a serving cell corresponds to a single band. Whether a gap is required is indicated by 0 and 1, or may alternatively be indicated by using a Boolean function BOOLEAN. In some embodiments, the content reported by the terminal device further includes a multiple-input multiple-output capability for each cell or CA. For example, in a cell corresponding to a band A1, a quantity of receive channels of the terminal device is 2. During implementation, the following manner may be used:

bandEUTRA-r10:3,0×26
supportedMOMO-CapabilityDL-r10:twoLayers(0,0×0) indicates that a quantity of layers that support multiple-input multiple-output on a band 3 is 2, and supportedMOMO-CapabilityDL-r10:fourLayers(0,0×0) indicates that a quantity of layers that support multiple-input multiple-output on the current frequency band is 4. In some embodiments, the quantity of layers is a corresponding quantity of receive channels of the terminal device.

Table 2 shows measurement capabilities of 11 CA combinations or frequency bands; in other words, whether a gap needs to be allocated. For example, in a case of 1A+3A, because the CA combination needs to occupy four receive channels, and the current terminal device has four channels, in other words, there is no extra channel to measure a neighboring cell, the network side needs to allocate a gap. However, Table 2 shows only a capability of requiring allocation of a gap or not for an inter-frequency band. For details about whether a gap needs to be allocated for inter-RAT measurement, refer to the capability reported by the terminal device, as shown in Table 3.

inter-RAT measurement. In other words, Table 3 shows a capability of requiring allocation of a gap or not when cells belong to different network systems based on a CA combination. For example, CA_1A+3A is used as an example. When inter-RAT measurement needs to be performed, for example, a trigger condition may be an event A4 or initiated by the network, the network needs to allocate a gap to the terminal device for inter-frequency measurement based on an inter-frequency measurement capability of the terminal device.

The terminal device further needs to report a supported CA capability, a multiple-input multiple-output capability (quantity of layers) for each cell or CC, and a corresponding measurement capability. The network side may configure a corresponding quantity of layers based on a receive channel capability of the terminal device for each cell or CC. The network side determines, based on the measurement capability reported by the terminal device, whether a gap needs to be allocated, and determines various different CA combinations based on the CA capability uploaded by the terminal device.

Step 602: The network side determines, based on the trigger condition and the measurement capability reported by the terminal device, whether a gap needs to be allocated. If a gap does not need to be allocated based on the measurement capability reported by the terminal device, step 603 is performed. If the network side determines, based on the measurement capability reported by the terminal device, that a gap needs to be allocated, step 604 is performed.

Generally, a procedure of establishing a secondary cell Scell mainly includes: The terminal device initiates a radio resource control (Radio Resource Control, RRC) connection procedure in a primary cell Pcell, and the network side determines, based on the measurement capability reported by the terminal device, whether a measurement gap needs to be configured. If the terminal device needs a gap to perform inter-frequency measurement, the network side delivers measurement control information (frequency channel number information, measurement bandwidth, a measurement parameter, a measurement report parameter, and the like) and configures a measurement gap period and a subframe offset parameter. If the terminal device does not need to start the gap to perform measurement, the network side skips configuration of the measurement gap and directly delivers the measurement control information.

Step 603: When the network side determines, based on the measurement capability reported by the terminal device, that a gap does not need to be allocated to the terminal device, the network side configures a measurement control message such as a frequency channel number, a measurement threshold, measurement bandwidth, a measurement parameter, or a measurement report parameter in a radio resource control connection reconfiguration message (RRC Connection Reconfiguration), and does not allocate gap-related information.

| interRAT-NeedForGaps | 1A | 3A | [1A] 4Rx | 7A | 1A + 3A | 1A + 7A | 1A + 1A | 3A + 1A | 3A + 3A | 3A + 7A | 7A + 3A |
|---|---|---|---|---|---|---|---|---|---|---|---|
| UMTS | T | T | T | T | T | T | T | T | T | T | T |
| GSM | T | T | T | T | T | T | T | T | T | T | T |
| CDMA 2000 | T | F | T | T | T | T | T | T | T | T | T |

Table 3 is a schematic diagram of a capability of requiring allocation of a gap or not when the terminal device performs When determining, through measurement, that an inter-frequency channel number meets a threshold of an event A4

(A4 Event), the terminal device reports the event A4. The network side detects a cell that meets an A4 measurement condition and that is reported by the terminal device, and if there are cells in a same cell set, the network side delivers an RRC reconfiguration request message RRC Reconfiguration Req to the terminal device, and configures the cell as a Scell of the terminal device for CA. According to a protocol, the event A4 is defined as: Quality of an inter-frequency neighboring cell is higher than a specific threshold, and a trigger condition is Mn+Ofn+Ocn−Hys>Thresh, where Mn is a measurement result of an inter-frequency cell; Ofn is a frequency offset, that is, a specific frequency offset of a neighboring cell frequency; Ocn is a cell offset, that is, a specific-cell offset of a cell; Hys is an inter-frequency handover amplitude hysteresis, that is, a hysteresis parameter of the event A4, and is determined by a parameter InterFreqHoA4Hyst; Thresh is a trigger threshold of adding a cell as a Scell, and is usually set to −94 dBm, −100 dBm, or −105 dBm based on RSRP. The system shown in FIG. 1 is used as an example. RSRP of a current primary serving cell is −92 dBm, and RSRP of an inter-frequency cell is −88 dBm. If the threshold of A4 is set to −91 dBm, a cell 2 may be configured as a Scell.

Step 604: The network side delivers measurement control information (frequency channel number information, measurement bandwidth, a measurement parameter, a measurement report parameter, and the like) and configures a measurement gap period and a subframe offset based on the measurement capability reported by the terminal device.

Generally, the network side periodically sends the measurement control information and configures the gap period for the terminal device to measure information about an inter-frequency or inter-RAT cell.

Step 605: Further, in this embodiment, when the terminal device receives parameters such as the measurement control information and the gap period that are delivered by the network side, the terminal device evaluates whether a capability of measuring a neighboring cell without allocation of a gap can be achieved by reducing receive channels of the current cell (for example, reducing a quantity of layers). For example, if a cell frequency band of a current Pcell is configured as four layers by the network, a CC of the current Pcell occupies four channels, and when the network side needs inter-frequency measurement to add a Scell, the network side determines, based on a capability that is of whether a gap needs to be allocated and that is reported by the terminal device, that a gap currently needs to be allocated. In this embodiment, to avoid service performance such as a delay or an interruption of data, the terminal device evaluates whether a capability of performing measurement without allocation of a gap can be achieved by reducing receive channels of the Pcell; in other words, a receiving capability of four layers of the Pcell frequency band is changed to a receiving capability of two layers. In this case, the terminal may modify occupation of four receive channels by the Pcell to occupation of two receive channels, and use two released channels to measure network quality of a neighboring cell, so that the neighboring cell can be measured without allocation of a gap.

Step 606: When determining, through evaluation, that the capability of measuring a neighboring cell without allocation of a gap can be achieved by reducing quantities of layers of some CCs, the terminal device may report assistance information, so that the network side reconfigures "no gap is allocated".

For example, layers are reduced by using an AssistanceInformation message of the terminal device. Descriptions of the AssistanceInformation message of the terminal device in the protocol are as follows:
1. if the UE prefers a configuration primarily optimized for power saving:
   2> set powerPrefindication to lowPowerConsumption;
2. else
   2> start or restart T340 with the timer val UE set to the PowerprefindicationTimer
   2> set PowerprefindicationTimer to normal;

The UE shall submit the UE AssistanceInformation message to lower layers for transmission.

After receiving the assistance information reported by the terminal device, the network side reconfigures a quantity of layers of the primary cell Pcell. The network side determines, based on the configured quantity of layers and the measurement capability of the terminal device, not to allocate a gap to the terminal device.

Step 607: If network side determines, based on the measurement capability reported by the terminal device, that an objective of not allocating a gap cannot be achieved even if the quantities of layers of some CCs are reduced, the network side may deliver measurement control (frequency channel number information, measurement bandwidth, a measurement parameter, a measurement report parameter, and the like) and configures a measurement gap period and a subframe offset based on an existing procedure.

Step 608: The terminal device performs measurement based on the measurement control sent by the network, and reports a measurement result.

Step 609: The network side configures a secondary cell based on the measurement result reported by the terminal device.

Figure 7:
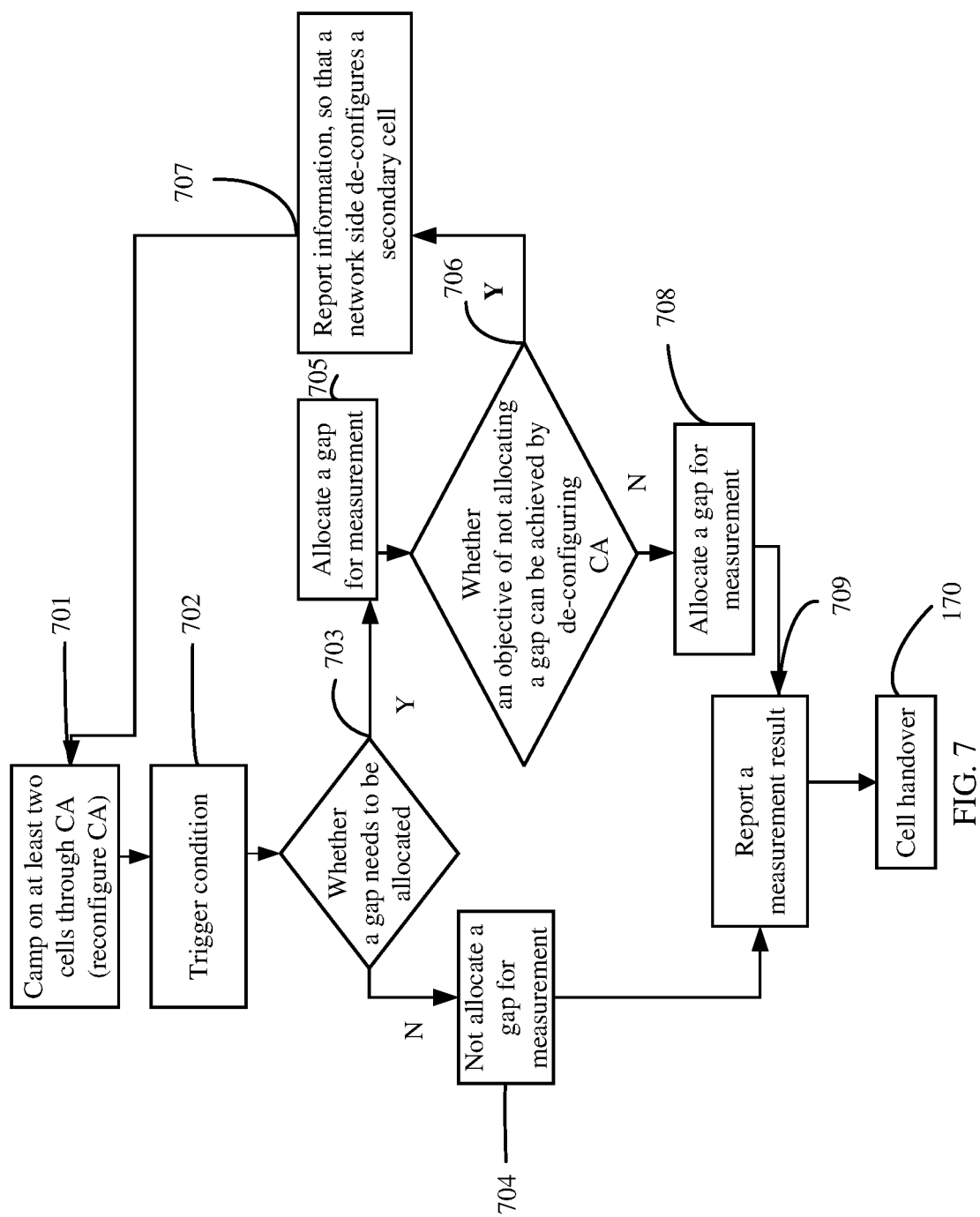
FIG. 7 is a second schematic diagram of enhancing a gap measurement capability of a terminal device according to an embodiment of this application.

As shown in FIG. 7, another method for allocating a gap based on a capability of a terminal device is provided. In this embodiment, when a network allocates inter-frequency measurement, the network determines, based on a measurement capability of the terminal device, whether a gap is required, to resolve a problem of how to measure a neighboring cell without allocation of a gap when the terminal device is in a connected state and receive channels of the terminal device are limited.

Step 701: A current serving cell of the terminal device operates on a CA combination, and the terminal device camps on a primary cell Pcell and a secondary cell Scell. In the system shown in FIG. 1, the terminal device 100 obtains a radio resource by using the serving cell 1 and the serving cell 2. As shown in Table 3, the terminal device may obtain the radio resource by using the following CA combinations: CA_1A-3A, CA_1A-7A, CA_1A-1A, CA_3A-1A, CA_3A-3A, CA_3A-7A, and CA_7A-3A.

Step 702: A current system meets a trigger condition.

In this embodiment, the trigger condition may be, for example, an event A2 specified in a protocol. To be specific, signal quality of the current serving cell (for example, the serving cell 1 or the serving cell 2) is less than a predetermined threshold, that is, Ms+Hys<Thresh, where Ms is a measurement result of the serving cell; Hys is an inter-frequency A1 or A2 amplitude hysteresis; and Thresh is an event-based A2 inter-frequency threshold, and A2 is used to start inter-frequency or inter-RAT measurement. In a possible embodiment, a network side needs to actively initiate a requirement for measuring a neighboring cell, or a trigger condition for mobility measurement of the terminal device and the like are met.

Step 703: The network side determines, based on the trigger condition and a capability reported by the terminal device, whether to allocate a corresponding gap. If a gap does not need to be allocated, step 704 is performed. If a gap needs to be allocated, step 705 is performed.

Based on an event (for example, the event A2) reported by the terminal device or when the network side needs to actively measure a network of the neighboring cell, the network side needs to determine, based on the capability reported by the terminal device, whether a gap needs to be allocated for measurement. In this application, the terminal device further evaluates whether measurement can be performed without using a gap by releasing some Scells. As shown in Table 4, after receiving the measurement capability reported by the terminal device, the network side further needs to consider whether to release a Scell to achieve an objective of not allocating a gap, so that the terminal device is not interrupted or delayed.

| InterFreqNeedforGaps | 1A | 3A | 4Rx [1A] | 7A | 1A + 3A | 1A + 7A | 1A + 1A | 3A + 1A | 3A + 3A | 3A + 7A | 7A + 3A |
|---|---|---|---|---|---|---|---|---|---|---|---|
| Band 1 | F | F | T | T | T | T | T | T | T | T | T |
| Band 3 | F | F | T | F | T | T | T | T | T | T | T |
| Band 7 | F | F | T | T | T | T | T | T | T | T | T |

Specifically, as shown in Table 4, for example, when the current terminal device is in a combination CA_1A+3A scenario, based on the measurement capability reported by the terminal device, if the network side requires measurement information of an inter-frequency neighboring cell, the network side needs to allocate a gap. However, when the terminal device determines, through evaluation, that the inter-frequency neighboring cell can be measured through de-configuration of a secondary cell, the network side may be enabled to de-configure the secondary cell, and reconfigure a CA combination, so that the network does not allocate a gap. The network side determines that the terminal does not need a measurement gap when measuring a same target frequency channel number. Measurement configuration does not include gap-related configuration information. For example, if the network side needs measurement information of a frequency channel number of an inter-frequency cell on a band 7, the network is enabled to de-configure a Scell (3A). In this case, the terminal device receives/sends data only on a band 1, and the terminal device can measure the inter-frequency cell on the band 7 without using a gap.

Step 704: When the network side determines, based on the capability reported by the terminal device, that a gap is not required, the network side configures a measurement control message (frequency channel number information, measurement bandwidth, a measurement parameter, a measurement report parameter, and the like) in an RRC connection reconfiguration message, and does not allocate gap-related information.

Step 705: If the terminal device needs to start a gap, the network side delivers measurement control information (frequency channel number information, measurement bandwidth, a measurement parameter, a measurement report parameter, and the like), a measurement gap period, and a subframe offset in an RRC connection reconfiguration message.

Step 706: The terminal device further determines whether the objective of not allocating a gap for measurement can be achieved by de-configuring CA or de-activating CA. If the terminal device determines that the objective of not allocating a gap for measurement can be achieved by de-configuring CA or de-activating CA, step 707 is performed; or otherwise, step 708 is performed.

Step 707: The terminal device may enable the network to de-configure a cc of a secondary cell, to achieve the objective of not allocating a gap by the network side. Specifically, the terminal device may actively report an event A2 of the secondary cell Scell, and the network side completes an action of de-configuring the Scell. After the network side de-configures the Scell, the network side reconfigures a new CA combination to determine whether the terminal device has a capability of performing inter-frequency measurement without allocation of a gap. The network side reconfigures CA and the measurement configuration information based on the event A2 reported by the terminal device and the measurement capability reported by the terminal device. Based on a new CA combination, the network side determines that the terminal does not need a measurement gap when measuring a same target frequency channel number, and measurement configuration does not include gap-related configuration information, that is, the measurement configuration information does not include the gap-related configuration information.

Specifically, after the network side receives the event A2 actively reported by the terminal device, the network side de-configures the secondary cell by delivering an RRC reconfiguration message, and the terminal device releases a receive channel of the secondary cell, and sends a response message to a network device, to indicate that the second cell is released. Further, the network side resends the measurement control information, where gap information is not configured.

Step 708: The terminal device determines, through evaluation, that the objective of not allocating a gap by the network side cannot be achieved in a manner for enabling the network side to de-configure a secondary cc, and the terminal device has the capability of performing inter-frequency measurement without allocation of a gap. In this case, the terminal device performs, based on the gap allocated by the network, inter-frequency cell measurement or inter-RAT measurement allocated by the network.

Step 709: The terminal device performs measurement based on measurement control sent by the network, and reports a measurement result.

Step 710: The network side performs cell handover based on the measurement result reported by the terminal device.

Figure 8:
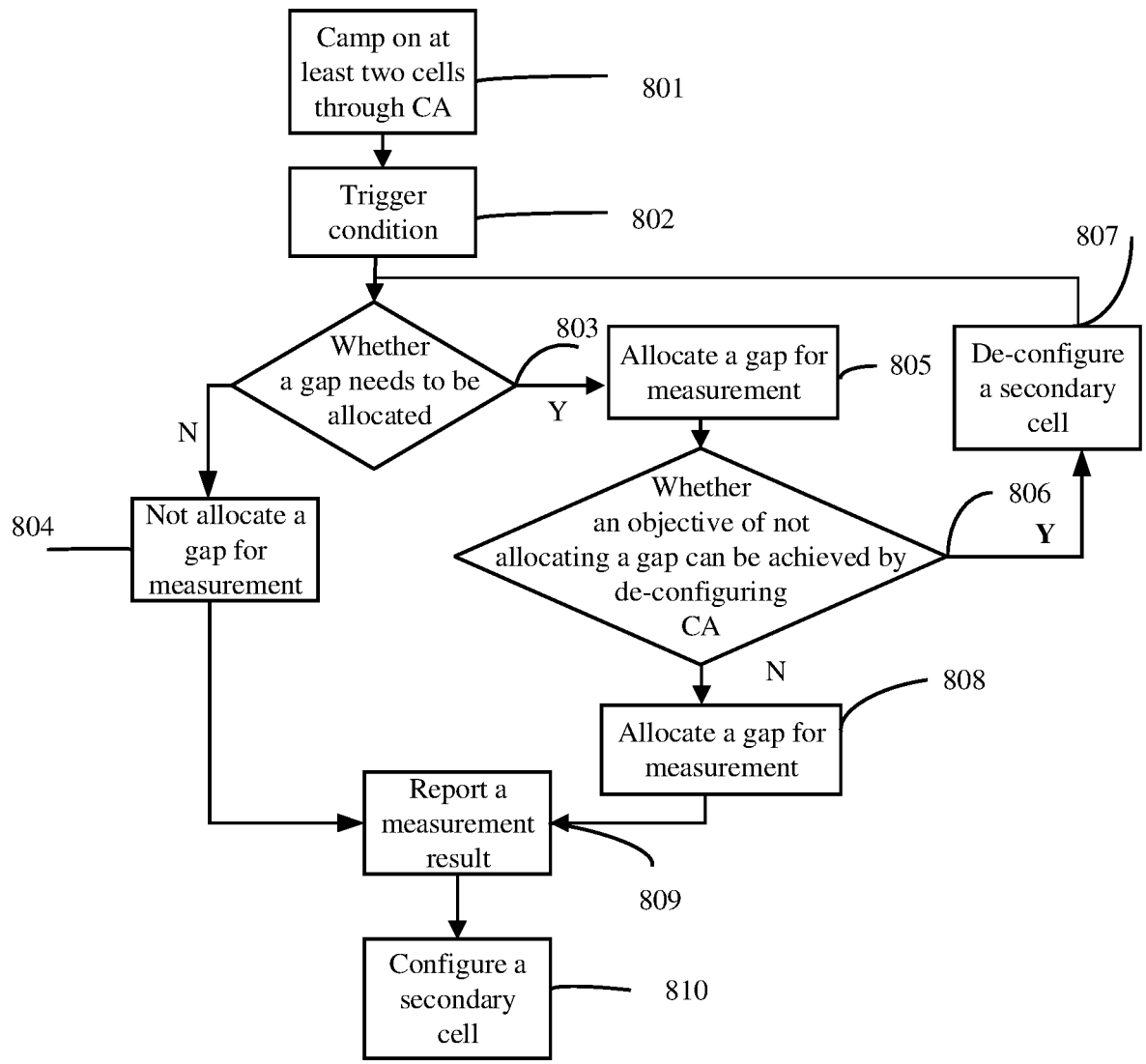
FIG. 8 is a third schematic diagram of enhancing a gap measurement capability of a terminal device according to an embodiment of this application.

As shown in FIG. 8, a method for allocating a gap based on a capability of a terminal device is provided. Layer specifications of some component carriers in a CA combination are actively reduced, so that the terminal device has a measurement capability of performing inter-frequency or inter-RAT measurement allocated by a network without allocation of a gap.

Step 801: The terminal device camps on at least two cells by using a CA combination, where a network side needs to configure a capability of four layers for a specific cell.

A current serving cell of the terminal device operates on a CA combination, and the terminal device camps on a primary cell Pcell and a secondary cell Scell. In the system shown in FIG. 1, the terminal device 100 obtains a radio resource by using the serving cell 1 and the serving cell 2, and either cell has a receiving capability of 2Rx. For example, when the terminal device reports a capability that two receive channels need to be occupied on a frequency band 1A, the network side allocates, during configuration, a corresponding quantity of layers based on a capability of occupying the receive channel.

Step 802: A system meets a trigger condition, for example, an event A2 reported by the terminal device or the network enables the terminal device to monitor another inter-frequency cell.

Step 803: The network side determines, based on a gap measurement capability reported by the terminal device, whether a gap needs to be allocated to the terminal device to measure information about a neighboring cell. If the network side determines that a gap does not need to be allocated, step 804 is performed. If the network side determines that a gap needs to be allocated, step 805 is performed.

Step 804: When the network side determines, based on the capability reported by the terminal device, that the gap is not required, the network side configures a measurement control message such as a frequency channel number in a radio-frequency control reconfiguration RRC re-configuration message, and does not allocate related information such as a gap period.

Step 805: If the terminal device needs to start a gap, the network side delivers measurement control information (frequency channel number information, measurement bandwidth, a measurement parameter, a measurement report parameter, and the like), and configures a measurement gap period and a subframe offset.

Step 806: When the terminal device determines, through evaluation, that a capability of measuring a neighboring cell without allocation of a gap can be achieved by reducing quantities of layers of some cell CCs, step 807 is performed; or otherwise, step 808 is performed.

Step 807: The network side allocates the gap for measurement of these inter-frequency channel numbers. The terminal device evaluates whether layers of some cc can be released, so that a measurement capability without allocation of a gap can be achieved. If the gap measurement capability can be achieved by releasing the 1 layers, when determining, through evaluation, that the capability of measuring a neighboring cell without allocation of a gap can be achieved by reducing quantities of layers of some CCs, the terminal device may report assistance information, so that the network side stops allocating a gap.

For example, data of the layer is reconfigured by using an AssistanceInformation message of the terminal device. Descriptions of the AssistanceInformation message of the terminal device in a protocol are as follows:
1. if the UE prefers a configuration primarily optimized for power saving:
   2> set powerPrefindication to lowPowerConsumption;
2. else
   2> start or restart T340 with the timer val UE set to the PowerprefindicationTimer
   2> set PowerprefindicationTimer to normal;

The UE shall submit the UE AssistanceInformation message to lower layers for transmission.

After receiving the assistance information reported by the terminal device, the network side reconfigures measurement information. For example, the network side reconfigures a quantity of layers of the primary cell Pcell. The network side determines, based on the configured quantity of layers and a measurement capability of the terminal device, not to allocate a gap to the terminal device. Specifically, either of the Pcell and the Scell occupies only one receive channel, and a to-be-measured frequency channel number also occupies only one channel. One channel is released in a component carrier. An inter-frequency channel number allocated by the network is measured by releasing the channel and one receive antenna at a front end. Another antenna is used for data receiving/sending of the component carrier. In this case, because the Pcell has only one receive channel for performing receiving, a corresponding receiving capability decreases, and a channel quality indicator (Channel Quality Indicator, CQI) is fed back based on an actual receiving capability.

Step 808: If network side determines, based on the measurement capability reported by the terminal device, that an objective of not allocating a gap cannot be achieved even if the quantities of layers of some CCs are reduced, the network side may deliver measurement control (frequency channel number information, measurement bandwidth, a measurement parameter, a measurement report parameter, and the like) and configures a measurement gap period and a subframe offset based on an existing procedure.

Step 809: The terminal device performs measurement based on the measurement control sent by the network, and reports a measurement result.

Step 810: The network side configures a secondary cell based on the measurement result reported by the terminal device.

Figure 9:
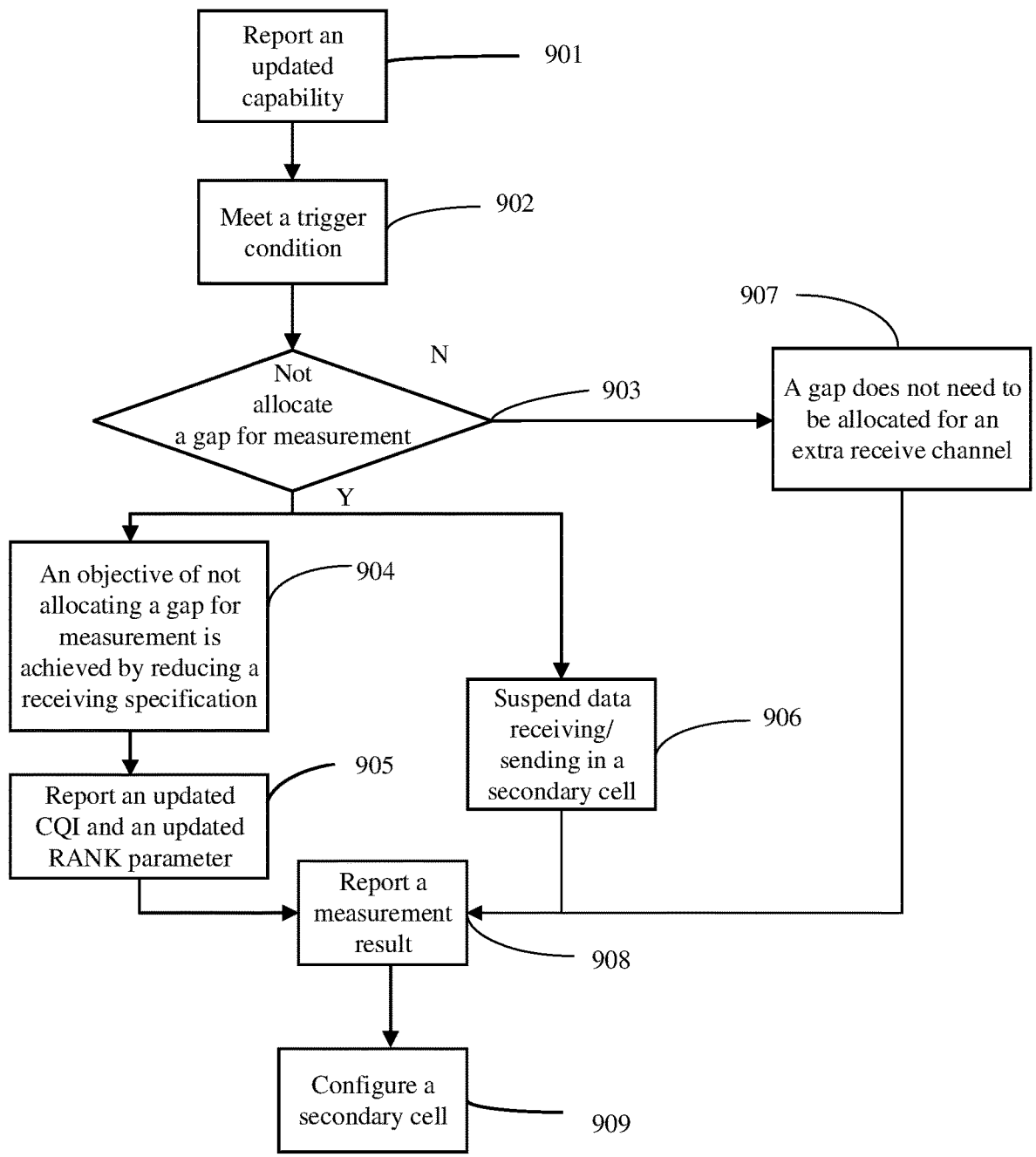
FIG. 9 is a fourth schematic diagram of enhancing a gap measurement capability of a terminal device according to an embodiment of this application.

As shown in FIG. 9, a method for allocating a gap based on a capability of a terminal device is further provided. By actively reducing a receiving specification, the terminal device can achieve a measurement capability of performing inter-frequency or inter-RAT measurement. During registration, the terminal device actively reports an updated gap measurement capability. During inter-frequency or inter-RAT measurement allocated by a network, the network determines, based on a capability reported by the terminal device, whether to allocate a gap for measurement.

The network side allocates a measurement frequency channel number and does not allocate a measurement gap. The terminal device determines whether the terminal device has a capability of performing simultaneous receiving based on a frequency channel number allocated by the network and a frequency channel number of a serving cell. If the terminal device does not have the capability of performing simultaneous receiving, the terminal device actively reduces a receiving specification by using a PHY layer and a MAC layer. The following manners may be used:

(1) De-activate an sec of a secondary cell; (2) The terminal device actively reduces receiving specifications of some carriers, for example, changes from 4Rx to 2Rx, and reports a measurement value based on a receiving capability of 2Rx; (3) A short-time preemption manner or the like is used, so that the terminal device can perform, in a manner of not using a gap for measurement, an inter-frequency or an inter-RAT measurement allocated by the network; or (4) The terminal device actively changes from 2Rx to 1Rx in some component carriers, and at the same time, reports a measurement value based on a receiving capability of 1Rx, and releases a channel for corresponding inter-frequency or inter-RAT measurement.

It is assumed that a front-end FEM of the terminal device supports three bands, an RFIC has four channels, and a BBIC can support both receiving/sending in the serving cell and inter-frequency measurement. It is assumed that an inter-RAT frequency channel number and a frequency channel number of the serving cell support a CA combination. In this case, the BBIC also supports both receiving/sending in the serving cell and inter-RAT measurement. For simplicity, only inter-frequency measurement in LTE is listed in the following table. At the same time, the following CA combinations are supported (1A indicates that a frequency channel number of a band 1 whose bandwidth is 20 MHz is 2Rx, and [1A] indicates that the band 1 is 4Rx)

It is assumed that the following CA combinations can be supported: CA_1A-3A, CA_1A-7A, CA_1A-1A, CA_3A-1A, CA_3A-3A, CA_3A-7A, and CA_7A-3A. It is assumed that an inter-frequency measurement capability of the terminal device entirely depends on a CA capability. The inter-frequency measurement capability is reported as follows, where T indicates that gaps are required, and F indicates that gaps are not required. This is shown in Table 5.

| InterFreqNeedforGaps | 1A | 3A | [1A] 4Rx | 7A | 1A + 3A | 1A + 7A | 1A + 1A | 3A + 1A | 3A + 3A | 3A + 7A | 7A + 3A |
|---|---|---|---|---|---|---|---|---|---|---|---|
| Band 1 | F | F | T | T | T | T | T | T | T | T | T |
| Band 3 | F | F | T | F | T | T | T | T | T | T | T |
| Band 7 | F | F | T | T | T | T | T | T | T | T | T |

After the terminal device reports the capability, when the network allocates inter-frequency measurement, whether a gap is required is determined based on a measurement capability of the terminal device. It can be learned from the foregoing table that when the terminal device uses a CA combination or 4Rx, a gap is required in inter-frequency measurement due to a capability limitation of the terminal device. If the terminal device can have a capability of not requiring allocation of a gap in a manner of reducing a receiving specification or de-configuring a CC of a secondary cell, the terminal device actively reports an updated measurement capability. As shown in Table 6, the corresponding reported gap measurement capability is as follows:

| InterFreqNeedforGaps | 1A | 3A | [1A] 4Rx | 7A | 1A + 3A | 1A + 7A | 1A + 1A | 3A + 1A | 3A + 3A | 3A + 7A | 7A + 3A |
|---|---|---|---|---|---|---|---|---|---|---|---|
| Band 1 | F | F | F | T | F | F | F | F | F | F | T |
| Band 3 | F | F | F | F | F | F | F | F | F | F | F |
| Band 7 | F | F | F | T | F | F | F | F | F | F | T |

It can be learned from the table that the gap measurement capability of the terminal device is greatly improved. Based on a plurality of CA combinations, no-gap measurement can be implemented by reducing a quantity of data receiving channels and de-configuring a secondary cell.

Further, a serving cell of the terminal device may further reduce receive antennas, so that a capability of performing measurement without allocation of a gap is achieved. For example, it is assumed that there is no CA capability on B7 and B1. On B7, only a main set channel may be used, and a diversity channel is not used. Then, the terminal device has a capability of measuring a frequency channel number on B3 by using the diversity channel. For the serving cell B7, measurement is performed on another frequency channel number on B7 in a similar manner. This is shown in Table 7.

| InterFreqNeedforGaps | 1A | 3A | [1A] 4Rx | 7A | 1A + 3A | 1A + 7A | 1A + 1A | 3A + 1A | 3A + 3A | 3A + 7A | 7A + 3A |
|---|---|---|---|---|---|---|---|---|---|---|---|
| Band 1 | F | F | F | F | F | F | F | F | F | F | F |
| Band 3 | F | F | F | F | F | F | F | F | F | F | F |
| Band 7 | F | F | F | F | F | F | F | F | F | F | F |

A specific method is as follows:

Step 901: The terminal device reports an updated capability.

In this application, as shown in Table 5, when camping on a cell, the terminal device reports a CA capability supported by the terminal device, a multiple-input multiple-output capability (a quantity of layers) for each cell or CC, and a measurement capability of requiring a gap or not in different cells.

In Table 6, a measurement capability of requiring allocation of a gap in the table is updated. In one aspect, the terminal device determines whether a capability of not requiring allocation of a gap can be achieved by reducing a receiving specification of the terminal device. For example, Table 5 shows an original gap measurement capability of the terminal device. In inter-frequency measurement in most scenarios, the network side needs to allocate a gap. For example, if the terminal device currently needs to receive/send data at a frequency channel number [1A] by using 4Rx, the network needs to allocate a gap for measurement of an inter-frequency cell. The terminal device further determines, through evaluation, that an objective of not requiring allocation of a gap can be achieved by reducing a receiving specification. As shown in Table 6, the terminal device reports the updated capability, and the network does not need to allocate a gap for measurement of an inter-frequency cell. For another example, as shown in Table 5, in a CA_1A+3A scenario, if the terminal device currently needs to receive/send data by using 4Rx, the network needs to allocate a gap for measurement of an inter-frequency cell. The terminal device further determines, through evaluation, that an objective of not requiring allocation of a gap can be achieved by reducing a receiving specification. As shown in Table 6, the terminal device reports the updated capability, and the network does not need to allocate a gap for measurement of an inter-frequency cell. In another aspect, the terminal device may further measure a neighboring cell by de-configuring or de-activating a secondary cell. If the terminal currently needs to receive/send data by using 4Rx in the CA_1A+3A scenario, the network needs to allocate a gap for measurement of an inter-frequency cell. The terminal device further determines, through evaluation, that an objective of not allocating a gap can be achieved by de-activating a cc of a secondary cell. As shown in Table 6, the terminal device reports the updated capability, and the network does not need to allocate a gap for measurement of an inter-frequency cell.

In some embodiments, as shown in Table 7, it is assumed that there is no CA capability on B7 and B1. On B7, only a main set channel may be used, and a diversity channel is not used. Then, the terminal device has a capability of measuring a frequency channel number on B3 by using the diversity channel. For the serving cell B7, measurement is performed on another frequency channel number on B7 in a similar manner.

Step 902: A system meets a trigger condition, for example, an event A2 reported by the terminal device or the network enables the terminal device to monitor another inter-frequency cell.

Step 903: The network side determines, based on a gap measurement capability reported by the terminal device, whether a gap needs to be allocated to the terminal device to measure information about a neighboring cell. If the network side determines that a gap does not need to be allocated, step 907 is performed. If the network side determines that a gap needs to be allocated, step 904 or step 906 is performed.

Step 904: The terminal device reduces a specification of a current data receiving channel.

For example, in a current CA_1A+3A scenario, 1A occupies receive channels Rx1 and Rx2, and 3A occupies Rx3 and Rx4. In this case, a neighboring cell may be measured by reducing the specification of the current data receiving channel. Specifically, the neighboring cell is measured by using Rx2 and Rx3.

During implementation of this embodiment, the terminal device reduces a multiple-input multiple-output capability of the terminal device, and may reconfigure data of a layer by configuring an AssistanceInformation message for the network side. In a possible design, the terminal device may reduce the multiple-input multiple-output capability by disabling a quantity of receive channels of the terminal device. It may be understood that in this case, the network side still periodically allocates gap-related information to the terminal.

Step 905: The terminal device reports an updated CQI and an updated rank indication (rank indication) parameter.

A receive channel rule of the terminal device is reduced. Correspondingly, to avoid a decrease in a service receiving capability, a corresponding measurement report such as a rank and a CQI may be reduced. The terminal device measures an inter-frequency or an inter-RAT by using a released receiving capability.

Step 906: The terminal device suspends data receiving/sending in the secondary cell.

For example, in the current CA_1A+3A scenario, 1A occupies receive channels Rx1 and Rx2, and 3A occupies Rx3 and Rx4. In this case, a neighboring cell may be measured by de-configuring or de-activating the secondary cell. Specifically, the neighboring cell is measured by using Rx2 and Rx3.

During implementation of this embodiment, the terminal device may suspend data receiving/sending in the secondary cell, and may de-activate or de-configure the secondary cell in an RRC reconfiguration message. In a possible design, the terminal device may suspend data receiving/sending in the secondary cell. It may be understood that in this case, the network side still periodically allocates gap-related information to the terminal.

Step 907: The gap does not need to be allocated for cell measurement.

When the network side determines, based on the capability reported by the terminal device, that a gap is not required, the network side configures a measurement control message such as a frequency channel number in an RRC connection reconfiguration message, and does not allocate gap-related information.

Step 908: The terminal device performs measurement based on measurement control sent by the network, and reports a measurement result.

Step 909: The network side configures the secondary cell based on the measurement result reported by the terminal device.

In an NSA scenario, there is currently no corresponding no-gap capability for NR measurement in an LTE standard. The network allocates a gap by default, and a length of the gap is 6 ms specified in the LTE standard. As a 5G standard specification is formulated, a non-standalone (Non-standalone, NSA) scenario and a standalone (standalone, SA) scenario are being deployed, where NSA means that an LTE system is used as a master cell group (Master Cell group, MCG) and an NR system is used as a secondary cell group (Secondary Cell group, SCG). FIG. 9 is a schematic diagram of typical dual connectivity.

Figure 10:
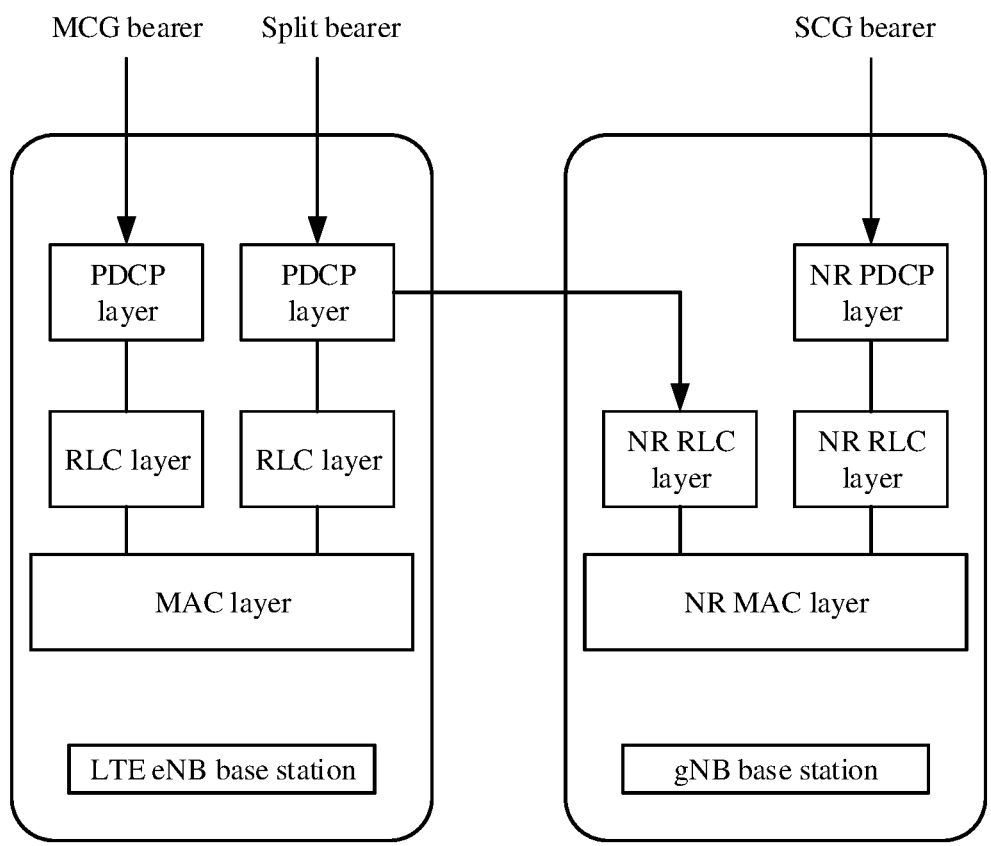
FIG. 10 is a first schematic diagram of a dual-connectivity system according to an embodiment of this application.

As shown in FIG. 10, in dual connectivity, downlink data transmission is used as an example. A data stream is split and combined at a PDCP (Packet Data Convergence Protocol, packet data convergence protocol) layer, and then the data stream is transmitted to a user by using a plurality of base stations at the same time. In this case, one PDCP entity may be associated with two RLC (Radio Link Control, radio link control) entities, and this may be understood as follows: The PDCP layer transmits the data stream to the RLC layer by using RLC1 and RLC2 links. Specifically, the RLC1 link may be understood as an LTE link, the RLC2 link may be understood as an NR link, and each RLC entity separately corresponds to an LTE air interface and an NR air interface. In this scenario, for the data stream of the PDCP, a PDCP packet is separately sent on the LTE air interface and the NR air interface based on obtained authorization. This manner may be referred to as an MCG split bearer mode.

Before dual connectivity (Dual Connectivity) EN-DC, the terminal device needs to measure a signal of 5G NR. Generally, a period of a synchronization signal in NR is 20 ms, and a gap allocated in an LTE system is 6 ms. If the LTE allocated by the network is not synchronous with the NR, in the LTE, the NR cannot be measured by using a gap. In this case, the NR needs to be measured in no-gap mode. If the LTE occupies all radio frequency channels, the terminal device cannot measure an NR signal, and consequently cannot camp on the NR.

Figure 11:
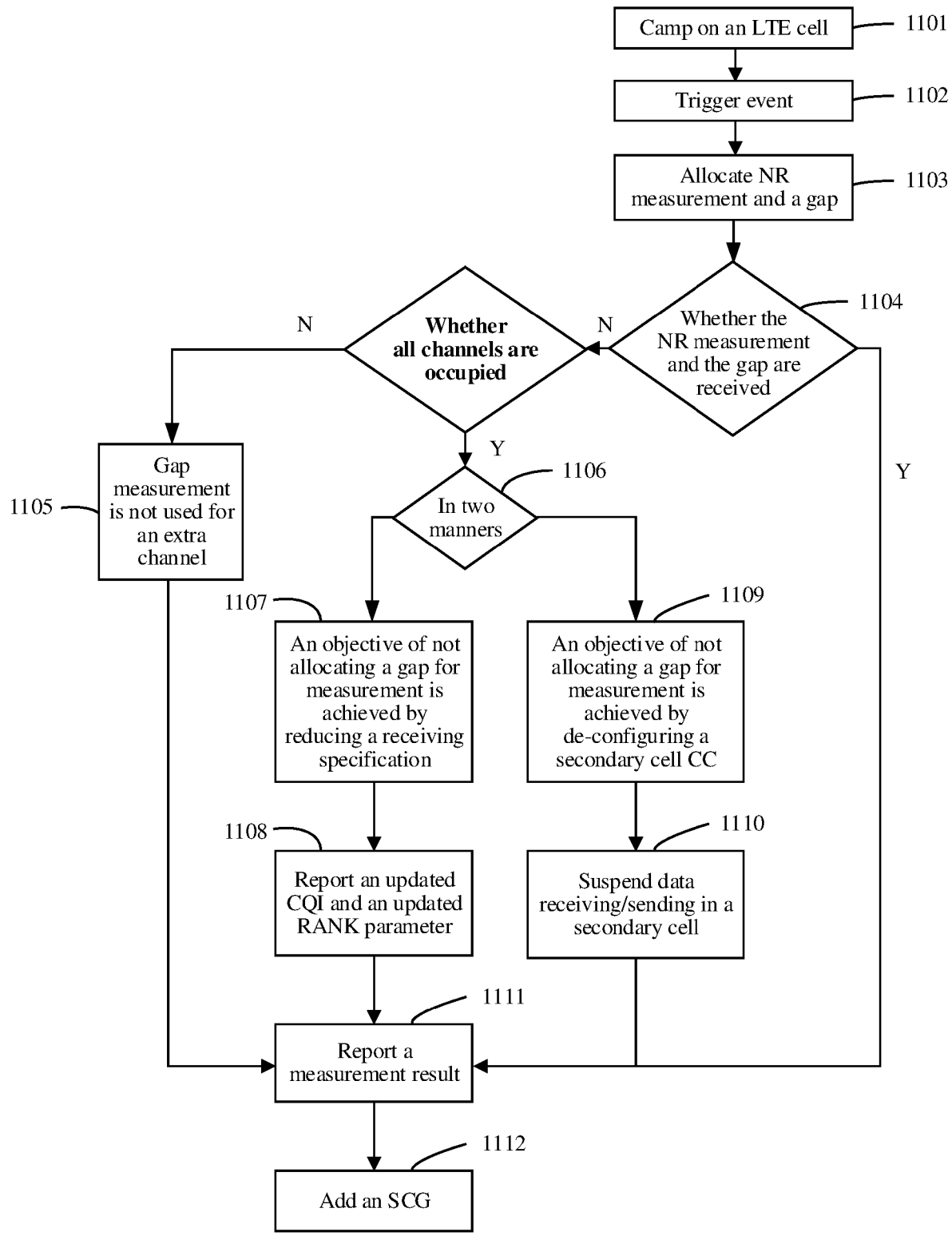
FIG. 11 is a fifth schematic diagram of enhancing a gap measurement capability of a terminal device according to an embodiment of this application.

A method for measuring network parameters in different systems is provided in FIG. 11, and is specifically as follows:

Step 1101: A terminal device camps on a first cell and a second cell, where the first cell and the second cell may be cells in an LTE system. Generally, the terminal device has reported, to a network side (a base station, a core network, or the like), a gap measurement capability supported by the terminal device, for example, InterFreqNeedForGaps mentioned in this application, and a multiple-input multiple-output capability supported by the terminal device is also included.

In some embodiments, the terminal device may alternatively camp on a third cell that needs to occupy four receive channels.

Step 1102: A network system meets a trigger condition.

Generally, the trigger condition may be that a network side needs to measure a network parameter of a neighboring cell, or may be that signal quality of a current serving cell is relatively poor and less than a preset threshold, or the like, to trigger the network side to measure the network parameter of the neighboring cell.

Step 1103: The network side allocates NR measurement and gap-related information.

The network side configures a frequency channel number of NR by using a configuration message, and accordingly reports an event B1 threshold and corresponding gap configuration. According to definitions in TS36.331 in a protocol, the event B1 is that a signal of a neighboring cell in an inter-RAT is stronger than an absolute threshold. The terminal device measures a cell of an NR frequency channel number by using a gap.

Step 1104: If the terminal device receives the gap information allocated by the network side, step 1110 is performed. If the terminal device does not receive the gap information allocated by the network side, the terminal device further determines whether all receive channels of the terminal device are occupied.

Figure 12:
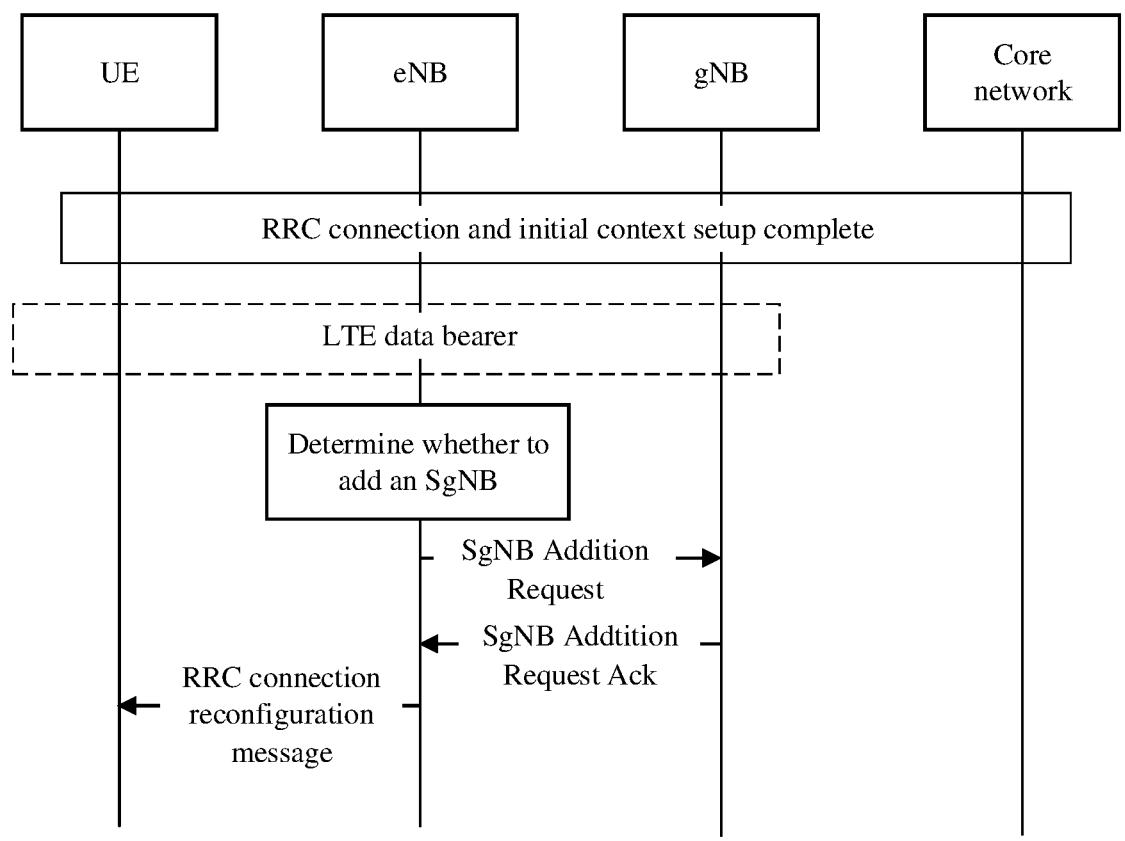
FIG. 12 is a second schematic diagram of a dual-connectivity system according to an embodiment of this application.
Figure 13:
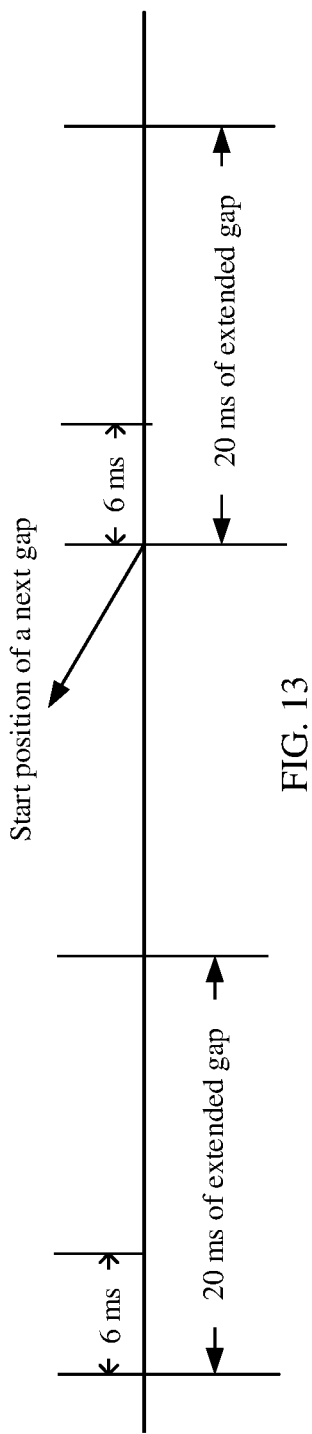
FIG. 13 is a second schematic diagram of a measurement gap according to an embodiment of this application.

Generally, a reason why the terminal device does not receive the gap-related information sent by the network side may be that periods of signals in an LTE system and an NR system are inconsistent. In the system shown in FIG. 12, a dual-connectivity EN-DC method is shown. For example, before a step "RRC connection reconfiguration message", synchronization between LTE and NR is required. As shown in FIG. 13, a synchronization signal of the NR is in a gap allocated by the network, a period of the synchronization signal in the NR is 20 ms, and a length of a gap allocated in the LTE system is 6 ms, and consequently, it cannot be ensured that the synchronization signal of the NR is included in the 6 ms. In other words, if the LTE and the NR allocated by the network are not synchronous, the gap allocated in the LTE does not include NR information, and the terminal device cannot detect the NR in the gap.

Step 1105: If the terminal device has an extra receive channel, the terminal device directly measures a network parameter of an NR cell by using an idle channel.

In this case, the terminal device measures the network parameter of the NR cell by using a remaining receive channel, and the network side allocates control information for NR measurement, and does not need to allocate the gap-related information.

Step 1106: If all receive channels of the terminal device are occupied, the terminal device may measure a neighboring cell in two manners: step 1107 or step 1108.

Step 1107: If all the receive channels of the current terminal device are occupied, the terminal device determines, through evaluation, that the neighboring cell is measured by reducing a corresponding receiving specification.

For example, if the terminal currently needs to receive/send data by using 4Rx in a CA_1A+3A scenario, the network needs to allocate a gap for measurement of an inter-frequency cell. The terminal device further determines, through evaluation, that an objective of not allocating a gap can be achieved by reducing the current receiving specification, for example, data of a layer is reconfigured by using the foregoing AssistanceInformation message.

During implementation of this embodiment, the terminal device reduces a multiple-input multiple-output capability of the terminal device, and may reconfigure data of a layer by configuring an AssistanceInformation message for the network side. In a possible design, the terminal device may reduce the multiple-input multiple-output capability by disabling a quantity of receive channels of the terminal device. It may be understood that in this case, the network side still periodically allocates gap-related information to the terminal.

Step 1108: When a quantity of receive channels of the terminal device decreases, report an updated CQI and an updated RANK parameter.

Step 1109: If all the receive channels of the current terminal device are occupied, the terminal device determines, through evaluation, that the neighboring cell can be measured by de-activating a secondary cell.

For example, if the terminal currently needs to receive/send data by using 4Rx in a CA_1A+3A scenario, the network needs to allocate a gap for measurement of an inter-frequency cell. The terminal device further determines, through evaluation, that an objective of not allocating a gap can be achieved by de-configuring or de-configuring a CC of the secondary cell, for example, an event A2 is reported.

During implementation of this embodiment, the terminal device may suspend data receiving/sending in the secondary cell, and may de-activate or de-configure the secondary cell in an RRC reconfiguration message. In a possible design, the terminal device may suspend data receiving/sending in the secondary cell. It may be understood that in this case, the network side still periodically allocates gap-related information to the terminal.

Step 1110: The terminal device suspends data receiving/sending in the secondary cell.

The terminal device performs cell measurement on a receive channel occupied by the secondary cell, and suspends data receiving/sending in the secondary cell in the foregoing manner of de-configuring or de-activating the secondary cell. This is not limited in this application.

Step 1111: The terminal device reports a measurement report.

The terminal device measures the network parameter of the NR cell, and uploads the measurement report to the network device in the manner shown in FIG. 2.

Step 1112: If NR measurement meets a B1 threshold configured by the network, report the NR measurement, and start an SCG adding procedure.

Figure 14:
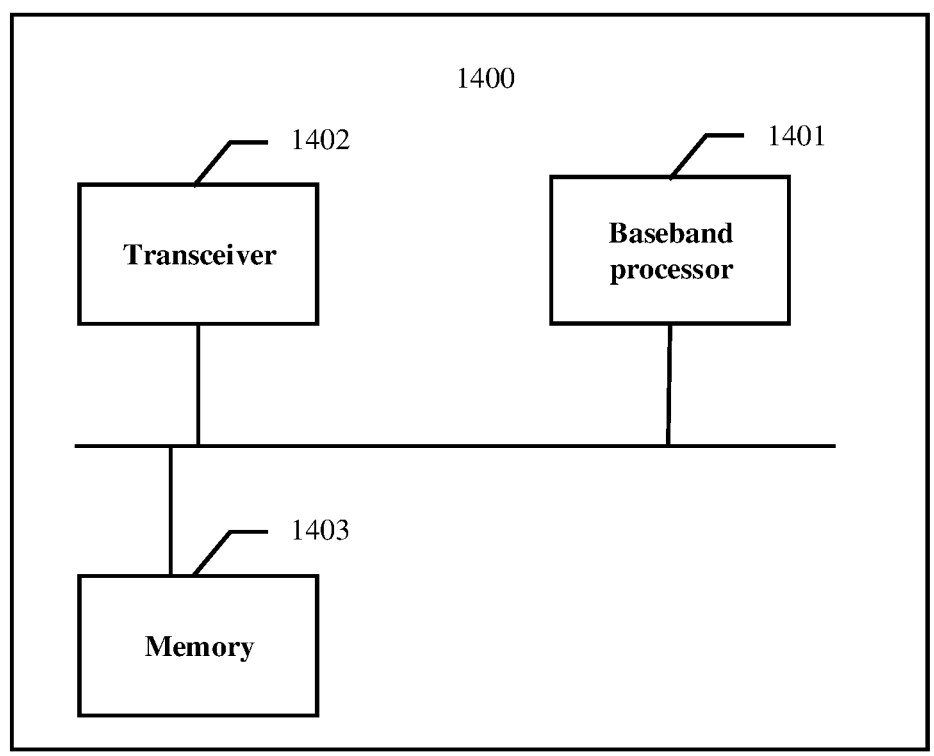
FIG. 14 is a schematic diagram of a chip system according to an embodiment of this application.

This application further provides a chip or chip system 1400. As shown in FIG. 14, the chip system 1400 includes a baseband processor 1401, a transceiver or interface 1402, a memory 1403, and the like. The interface 1402 is configured to receive code instructions, and send the received code instructions to the processor 1401. The processor 810 runs the received code instructions sent by the interface, to perform the method and the action for enhancing a measurement capability of a terminal device in embodiments of this application. For a specific manner of enhancing the measurement capability of the terminal device, refer to embodiments of this application. Details are not described herein again.

It should be noted that in this application, it is assumed that an RFIC has four receive channels (Rx1, Rx2, Rx3, and Rx4), and each cell occupies two receive channels. The embodiments of this application may further be extended to an assumption in which the RFIC has eight receive channels, or the like. This is not limited in embodiments of this application.

A person skilled in the art may clearly understand that embodiments of this application may be implemented by hardware, firmware, or a combination thereof. When implemented by using software, the foregoing function may be stored in a computer-readable medium or transmitted as one or more instructions or code on the computer-readable medium. The computer-readable medium includes a computer storage medium and a communication medium, where the communication medium includes any medium that can transfer a computer program from one place to another. The storage medium may be any available medium accessible to a computer. This is used as an example but is not limited to: a computer readable medium such as a RAM, a ROM, an electrically erasable programmable read-only memory (electrically erasable programmable read only memory, EEPROM), a compact disc read-only memory (compact disc read-Only memory, CD-ROM) or another optical disk storage, a magnetic disk storage medium or another magnetic storage device, or any other medium that can be used to carry or store expected program code in a form of an instruction or a data structure and that can be accessed by a computer. In addition, any connection may appropriately become a computer-readable medium. For example, if the software is transmitted from a website, a server, or another remote source by using a coaxial cable, an optical fiber cable, a twisted pair, a digital subscriber line (digital subscriber line, DSL), or a radio technology such as infrared, radio, and microwave, the coaxial cable, the optical fiber cable, the twisted pair, the DSL, or the radio technology such as infrared, wireless, and microwave are included in fixation of a medium to which the software belongs. As used in embodiments of this application, a disk (disk) and a disc (disc) include a compact disc (compact disc, CD), a laser disc, an optical disc, a digital versatile disc (digital video disc, DVD), a floppy disk, and a Blu-ray disc, where the disk generally copies data magnetically, and the disc optically copies data by using a laser. A combination thereof should also be included in the protection scope of the computer-readable medium.

In summary, the foregoing descriptions are merely embodiments of this application, and are not intended to limit the protection scope of this application. Any modification, equivalent replacement, and improvement made in accordance with the disclosure of this application shall be included in the protection scope of this application.

What is claimed is:

1. A method, comprising:
    sending, by a terminal device, first information to a network device, wherein the first information indicates whether a measurement gap is required when the terminal device performs inter-frequency measurement;
    camping, by the terminal device, on a first cell and a second cell using a carrier aggregation (CA) technology, wherein the first cell and the second cell are long term evolution (LTE) cells, and the first cell is a primary cell;
    when the terminal device meets a preset first condition, or when the network device meets a preset second condition, and when it is determined that a measurement gap is required, sending, by the network device, a second message to the terminal device based on the first information, wherein the second message indicates to measure a network parameter of a third cell, and the second message comprises measurement gap information;
    reporting, by the terminal device, an event A2 of the second cell, wherein the event A2 is specified in a protocol as indicating that a signal quality of a corresponding cell is less than a threshold, and the event A2 enables the network device to de-configure the second cell from being a carrier aggregation cell of the terminal device; and
    when it is determined that no measurement gap is required, sending, by the network device, a third message to the terminal device, wherein the third message indicates to measure the network parameter of the third cell, and the third message comprises no-gap information.

2. The method according to claim 1, further comprising:
    measuring, by the terminal device, the network parameter of the third cell based on the third message; and
    sending, by the terminal device, a measurement report about the third cell to the network device.

3. The method according to claim 2, wherein the preset first condition is that a network parameter of the first cell is less than a preset value, and the preset second condition is that the network device needs to measure a network parameter of a neighboring cell.

4. The method according to claim 1, further comprising:
    after reporting, by the terminal device, the event A2 of the second cell, sending, by the network device, a fourth message to the terminal device, wherein the fourth message indicates to de-configure the second cell;
    de-configuring, by the terminal device, the second cell based on the fourth message; and sending, by the terminal device, a fifth message to the network device, wherein the fifth message indicates that the terminal device has de-configured the second cell.

5. The method according to claim 1, wherein the first information comprises at least a InterFreqNeedForGaps parameter or a interRAT-NeedForGaps parameter.

6. A network communication system, comprising:
a network device; and
a terminal device, configured to:
camp on a first cell and a second cell using a carrier aggregation (CA) technology, wherein the first cell and the second cell are long term evolution (LTE) cells, and the first cell is a primary cell;
send first information to the network device, wherein the first information indicates whether a measurement gap is required when the terminal device performs inter-frequency measurement; and
report an event A2 of the second cell when the terminal device meets a preset first condition or when the network device meets a preset second condition, wherein the event A2 is specified in a protocol as indicating that a signal quality of a corresponding cell is less than a threshold, and the event A2 enables the network device to de-configure the second cell from being a carrier aggregation cell of the terminal device; and
wherein the network device is configured to:
send a second message to the terminal device based on the first information when it is determined that a measurement gap is required, wherein the second message indicates to measure a network parameter of a third cell, and the second message comprises measurement gap information; and
send a third message to the terminal device when it is determined that no measurement gap is required, wherein the third message indicates to measure the network parameter of the third cell, and the third message comprises no-gap information.

7. The system according to claim 6, wherein the terminal device is further configured to:
measure the network parameter of the third cell based on the third message; and
send a measurement report about the third cell to the network device.

8. The system according to claim 7, wherein the preset first condition is that a network parameter of the first cell is less than a preset value, and the preset second condition is that the network device needs to measure a network parameter of a neighboring cell.

9. The system according to claim 6, wherein the network device is further configured to:
send a fourth message to the terminal device, wherein the fourth message indicates to de-configure the second cell; and
wherein the terminal device is further configured to:
de-configure the second cell based on the fourth message; and
send a fifth message to the network device, wherein the fifth message indicates that the terminal device has de-configured the second cell.

10. The system according to claim 6, wherein the first information comprises at least a InterFreqNeedForGaps parameter or a interRAT-NeedForGaps parameter.

11. A method, comprising:
sending, by a terminal device, first information to a network device, wherein the first information indicates whether a measurement gap is required when the terminal device performs inter-frequency measurement;
camping, by the terminal device, on a first cell and a second cell using a carrier aggregation (CA) technology, wherein the first cell and the second cell are long term evolution (LTE) cells, and the first cell is a primary cell;
sending, by the network device, second information to the terminal device, wherein the second information indicates to measure a network parameter of a third cell, the third cell is a New Radio (NR) cell, and the second information comprises information of the measurement gap;
suspending, by the terminal device, data receiving or sending in the second cell when the terminal device finds no third cell during the measurement gap; and
measuring, by the terminal device, the network parameter of the third cell.

12. The method according to claim 11, further comprising:
sending, by the terminal device, a measurement report to the network device based on the network parameter of the third cell.

13. The method according to claim 12, wherein suspending, by the terminal device, data receiving or sending in the second cell comprises:
reducing, by the terminal device, a multiple-input multiple-output capability.

14. The method according to claim 12, wherein that the terminal device finds no third cell during the measurement gap comprises:
the terminal device finds no synchronization signal of the third cell in the measurement gap.

15. The method according to claim 11, wherein the second information is sent in a radio resource control (RRC) connection reconfiguration message.

16. The method according to claim 11, wherein measuring, by the terminal device, the network parameter of the third cell comprises:
measuring, by the terminal device, the network parameter of the third cell by using a receive channel occupied by the second cell.

17. A system, comprising:
a terminal device; and
a network device;
wherein the terminal device is configured to:
send first information to the network device, wherein the first information indicates whether a measurement gap is required when the terminal device performs inter-frequency measurement;
camping on a first cell and a second cell by using a carrier aggregation (CA) technology, wherein the first cell and the second cell are LTE cells, and the first cell is a primary cell;
wherein the network device is configured to:
send second information to the terminal device, wherein the second information indicates to measure a network parameter of a third cell, the third cell is a new radio (NR) cell, and the second information comprises information of the measurement gap;
suspending, by the terminal device, data receiving or sending in the second cell when the terminal device finds no third cell during the measurement gap; and
measuring, by the terminal device, the network parameter of the third cell.

18. The system according to claim 17, wherein the terminal device is further configured to:
- send a measurement report to the network device based on the network parameter of the third cell.

19. The system according to claim 17, wherein suspending, by the terminal device, data receiving or sending in the second cell comprises:
- reducing a multiple-input multiple-output capability.

* * * * *